(12) United States Patent
Costa et al.

(10) Patent No.: US 11,149,111 B2
(45) Date of Patent: Oct. 19, 2021

(54) PROCESS TO PREPARE A CYCLIC OLIGOMER AND A CYCLIC OLIGOMER OBTAINABLE THEREBY AND A PROCESS TO POLYMERIZE IT

(71) Applicant: Sulzer Management AG, Winterthur (CH)

(72) Inventors: Liborio Ivano Costa, Winterthur (CH); Peter Joachim Fleckenstein, Zürich (CH); Jan-Georg Rosenboom, Zürich (CH); Giuseppe Storti, Zürich (CH); Massimo Morbidelli, Zürich (CH)

(73) Assignee: SULZER MANAGEMENT AG, Winterthur (CH)

( * ) Notice: Subject to any disclaimer, the term of this patent is extended or adjusted under 35 U.S.C. 154(b) by 99 days.

(21) Appl. No.: 16/606,388

(22) PCT Filed: Mar. 23, 2018

(86) PCT No.: PCT/EP2018/057518
§ 371 (c)(1),
(2) Date: Oct. 18, 2019

(87) PCT Pub. No.: WO2018/192743
PCT Pub. Date: Oct. 25, 2018

(65) Prior Publication Data
US 2021/0189061 A1 Jun. 24, 2021

(30) Foreign Application Priority Data
Apr. 21, 2017 (EP) ..................................... 17167601

(51) Int. Cl.
| | | |
|---|---|---|
| *C08G 63/181* | (2006.01) | |
| *C08G 63/81* | (2006.01) | |
| *C08G 63/90* | (2006.01) | |
| *C08G 63/91* | (2006.01) | |

(52) U.S. Cl.
CPC .......... *C08G 63/181* (2013.01); *C08G 63/81* (2013.01); *C08G 63/90* (2013.01); *C08G 63/916* (2013.01); *C08G 2115/00* (2021.01)

(58) Field of Classification Search
USPC ................. 528/271, 272, 296, 308
See application file for complete search history.

(56) References Cited

U.S. PATENT DOCUMENTS

| 5,434,244 A | 7/1995 | Warner et al. |
|---|---|---|
| 2006/0128935 A1 | 6/2006 | Tam |
| 2019/0233583 A1* | 8/2019 | Costa ..................... C08G 63/78 |

FOREIGN PATENT DOCUMENTS

| CN | 103509177 A | 1/2014 |
|---|---|---|
| CN | 106380462 A | 2/2017 |
| RU | 2411255 C2 | 2/2011 |
| WO | 0218476 A2 | 3/2002 |
| WO | 2014139602 A1 | 9/2014 |
| WO | 2014139603 A1 | 9/2014 |

OTHER PUBLICATIONS

Hamilton S C et al., "Cyclic polyesters: part 8. Preparation and characterization of cyclic oligomers in six aromatic ester and ether-ester systems", Polymer, Elsevier Science Publishers B.V., GB, vol. 39, No. 14, Jun. 1, 1998, pp. 3241-3252.
Carlos Morales-Huerta Juan et al., "Poly(alkylene 2,5-furandicarboxylate)s (PEF and PBF) by ring opening polymerization", Polymer, vol. 87, Feb. 3, 2016, pp. 148-158.
Stefanie Ortanderl, "Thieme Römpp Wasserabscheider", Feb. 10, 2017, 1 Page.
David Pfister et al., "Synthesis and Ring-Opening Polymerization of Cyclic Butylene 2,5-Furandicarboxylate", Macromolecular Chemistry and Physics, vol. 216, No. 21, Nov. 1, 1015, pp. 2141-2146.
Claude Moreau et al., "Recent Catalytic Advances in the Chemistry of Substituted Furans from Carbohydrates and in the Ensuing Polymers", Topics in Catalysis, Kluwer Academic Publishers-Plenum Publishers, NE, vol. 27, No. 1-4, Feb. 1, 2004, pp. 11-30.
Extended European Search Report dated Oct. 18, 2017 in corresponding European Patent Application No. 17167601.8, filed Apr. 21, 2017.
Extended European Search Report dated Apr. 3, 2017 in corresponding European Patent Application No. 16191553.3, filed Sep. 29, 2016.
International Search Report and Written Opinion dated Dec. 21, 2017 in corresponding International Application No. PCT/EP2017/074485, filed Sep. 27, 2017.
English Translation of Russian Office Action dated May 31, 2021 in corresponding Russian Patent Application No. 2019133643/04.
An Examination Report in the corresponding Taiwanese Patent Application No. 107113038, dated Jul. 22, 2021.
An Office Action in the corresponding Chinese Patent Application No. 201880041582.4, dated Aug. 30, 2021.

* cited by examiner

*Primary Examiner* — Terressa Boykin
(74) *Attorney, Agent, or Firm* — Global IP Counselors, LLP

(57) ABSTRACT

A process to prepare a (iv) cyclic polyester oligomer composition includes a cyclic polyester oligomer having furanic units and two to five repeat units. The process includes (a) reacting a monomer composition including: (i) a bifunctional furan-derivative and (ii) a diol in an linear oligomerization step to produce a (iii) linear oligomer composition including a linear oligomer species, (b) reacting the (iii) linear oligomer composition in a distillation-assisted cyclization (DA-C) step to form a (iv) cyclic polyester oligomer composition and a (v) diol byproduct. The (v) diol byproduct is removed by evaporation in the distillation-assisted cyclization (DA-C) step.

20 Claims, 9 Drawing Sheets

PROCESS TO PREPARE A CYCLIC OLIGOMER AND A CYCLIC OLIGOMER OBTAINABLE THEREBY AND A PROCESS TO POLYMERIZE IT

CROSS-REFERENCE TO RELATED APPLICATION

This application is a U.S. National Stage application of International Application No. PCT/EP2018/057518, filed Mar. 23, 2018, which claims priority to European Patent Application No. 17167601.8, filed Apr. 21, 2017, the contents of each of which are hereby incorporated herein by reference.

BACKGROUND

Field of the Invention

The present invention relates to a process to prepare a cyclic polyester oligomer composition comprising a cyclic polyester oligomer having furanic units, the oligomer composition obtainable thereby, as well as the use of the cyclic polyester oligomer composition in the production of a polyester polymer, particularly in the presence of a plasticizer (PL), and the polymer obtainable thereby.

Background Information

Recently new alternative raw materials to the diol and diacid or diester monomers conventionally used to prepare polyesters from furanic building blocks in industrial scale polymerization plants have been developed. WO2014/139603 (A1) discloses that cyclic polyester oligomers may be readily prepared in a process comprising the step of reacting a monomer component in a ring closing oligomerization step under conditions of a reaction temperature and reaction time sufficient to yield a cyclic polyester oligomer having furanic units. Such cyclic polyester oligomers advantageously do not produce large quantities of water or alcoholic side products nor do they require complex reaction and high-capacity devolatization equipment or harsh high temperature reaction and devolatilization steps in order to drive the polymerization to completion as disclosed in WO2014/139602 A1.

Nonetheless low levels of diacid, diol and acidol monomeric and/or dimeric and/or oligomeric species are present at equilibrium in the cyclic polyester oligomer of WO '603, and it was reported that they should be removed so that they would not detrimentally affect the storage stability of the oligomer or its subsequent polymerization processing behavior. It was disclosed that these undesired impurities could be removed from the oligomer product by conventional methods such as chromatography, selective precipitation, distillation, extraction, and crystallization, and a combination of filtration and chromatography was taught by example. Although such purification methods are effective, it is nonetheless desirable to have ones that are as—or preferably more—effective and selective and that do not require large quantities of solvents, long times or hybrid combinations, particularly for large-scale commercial production.

Although the production of polyester polymers by melt polymerization from such cyclic oligomers has been shown to be possible under milder thermal conditions (minimizing color and degradation) and with simpler equipment than polycondensation reactions in WO '602, nonetheless some cyclic oligomeric species have quite high melting points. For example, the often dominant cyclic dimer has a melting point of about 370° C. Thus although such oligomeric compositions may readily polymerize at milder temperatures below 300° C., significantly higher temperatures and harsher conditions may be required to melt the raw materials prior to their polymerization thereby causing degradation and discoloration of the thermally sensitive partially aliphatic oligomers. Some methods of overcoming these problems have been disclosed in patent application, EP 16191553.3-1377, which is hereby incorporated by reference. However further improvements particularly in terms of further process simplification and/or modification to give still more commercially-viable processes more readily suitable for larger-scale commercial plants are desirable.

In conclusion, it would be desirable to have further improved processes to both produce such cyclic polyester oligomers as well as to polymerize them, particularly for larger scale commercial operations.

SUMMARY

Starting from this state of the art, it is an object of the invention to provide an improved process to prepare a cyclic polyester oligomer having furanic units for use in producing polyester polymers having furanic units and that do not suffer from the previous mentioned deficiencies, particularly. A related object is to provide an improved process to use the cyclic polyester oligomer composition in the production of a polyester polymer.

In the present invention, "furanic units" refers to furan derivatives such as those based on the monomers FDA, HMFA, BHMF and their partially or fully reacted monoester or diester derivatives. Containing furanic units means that the fully or partially reacted derivative of such monomers is incorporated into the cyclic or linear polyester oligomer.

In the present invention, "distillation-assisted cyclization (DA-C)" means that that the cyclization reaction in a typically single reaction vessel is accompanied and enhanced by the simultaneous removal of condensation reaction byproducts (e.g. diol byproduct, such as ethylene glycol) and solvent through their evaporation, followed by the collection of these byproducts and solvent, as well as other volatile species, via condensation in a typically separate vessel.

According to embodiments of the invention, these objects are achieved by a process to produce a (iv) cyclic polyester oligomer composition comprising cyclic polyester oligomers having two to five repeat units and containing furanic units, the process comprising the steps of: (a) reacting a monomer composition comprising: (i) a bifunctional furan-derivative having two functional groups selected from the group consisting of carboxylic acid, ester, acid halide and their combinations and (ii) a diol in a linear oligomerization step to produce a (iii) linear oligomer composition comprising a linear oligomer species containing one or more furanic units and two to four repeat units, (b) reacting the (iii) linear oligomer composition in a distillation-assisted cyclization (DA-C) step to form a (iv) cyclic polyester oligomer composition comprising cyclic polyester oligomers having two to five repeat units and containing furan units and a (v) diol byproduct, wherein the (v) diol byproduct is removed by evaporation in the distillation-assisted cyclization (DA-C) step.

The (a) linear oligomerization step and the (b) distillation-assisted cyclization (DA-C) step will typically take place in different reaction units or reactors, for example, in a continuous or semi-continuous process, or at different points in time in a batch process, for example, first the (a) linear oligomerization step is carried out and then subsequently (b) the distillation-assisted cyclization (DA-C) step is carried out. It is beneficial that the two steps be carried out separately in the present invention because in (a) the linear oligomerization step it is favorable to have an excess of the (ii) diol, whereas in the (b) distillation-assisted cyclization (DA-C) step it is favorable to remove the (v) diol byproduct, and in many embodiments, the (ii) diol and the (v) diol byproduct may be the same chemical species. The two-step process [(a) and (b)] of the present invention is thus quite different then from the process disclosed in US 2006/128935, in which a macrocyclic polyester oligomer is produced by reactive distillation of a diester of a dicarboxylic acid and a diol in a distillation column with multiple separation trays to enable simultaneous separation and reaction of components along the column. The two-step process [(a) and (b)] of the present invention is also quite different then from the process of simply carrying out a reaction in a reactor equipped with a distillation column to remove volatiles as disclosed in the article, Wasserabscheider by Stefanie Ortlanderl from 2004-11-01 in the RÖMPP Online-Enzyklopädie (XP055411633).

DA-C has several advantages over cyclodepolymerization (CDP) processes, such as those disclosed in WO2014/139603 (A1). In both CDP and DA-C, both oligomerization and depolymerisation steps are required. However, CDP in the prior art examples required long reaction times in the oligomerization step of typically 12 h or more. In contrast, DA-C requires only relatively short reaction times in the (a) linear oligomerization step, e.g. of about 1 h.

Concerning processing and process equipment, CDP has a relatively high viscosity in the oligomerization step, whereas DA-C has only a relatively low viscosity. Furthermore, a low pressure is required during the oligomerization step in CDP to remove the condensation reaction byproduct (e.g. ethylene glycol), whereas the (a) linear oligomerization step may conveniently be carried out at or about atmospheric pressure in relatively simple equipment and processing in DA-C.

Finally, the purity of the reaction product (iv. cyclic polyester oligomer composition) in CDP is limited by removal of the condensation byproduct (e.g. ethylene glycol) in the oligomerization step, which is in turn limited by the viscosity of oligomer. In contrast, the reaction in DA-C may be driven by removal of the condensation byproduct (e.g. v. the diol byproduct, such as ethylene glycol) during the cyclodepolymerization step from the low viscosity solution, which is much more effective, thus leading to higher yields.

For example, in several typical embodiments the DA-C has only about 1 to about 5 mass % linear oligomers in the reaction product (as determined by HPLC). In contrast the CDP process typically contains about 20 to about 50 mass % linear oligomers in its reaction product (as determined by HPLC).

Furthermore DA-C often has further surprising advantages over CDP depending on the particular solvent system used. Often the linear oligomers typically used for CDP are not very soluble in the reaction solvent (e.g. ortho-dichlorobenzene), which would then make CDP unfeasible in this case. In contrast, the DA-C process starts with such short or low Mn oligomers that solubility is considerably less difficult.

The (iv) cyclic polyester oligomer composition comprising cyclic oligomers having two to five repeat units and containing furan units of the present invention will generally be free of high molecular weight linear polyester polymers. In certain embodiments, it will contain less than 20, preferably 15, more preferably less than 10 mass % of a linear polyester polymer having an Mn of more than 5,000 Dalton. Analogous embodiments free of high molecular weight linear polyester polymers will likewise be preferred for the (iv.a) purified cyclic polyester oligomer composition and the (iv.b) further cyclic polyester oligomer composition.

In one embodiment, the (b) distillation-assisted cyclization (DA-C) step takes place in the presence of a solvent, wherein the solvent is preferably selected from the group consisting of an ionic liquid, an optionally-substituted naphthalene, an optionally-substituted aromatic compound, and their mixtures.

The use of solvent in DA-C strongly favours the formation of cyclic polyester oligomers at much lower conversion levels of end groups in dilute reaction systems versus that of bulk systems. The higher boiling aromatic solvents provide good solubility, and the more volatile ones, such as xylenes, are more easily subsequently removed. Dichlorobenzene is often preferred due to its lower boiling point, lack of color, and relatively low melting point. Diphenyl ether is often preferred solvent as it is also colorless and odorless. Solvents having lower boiling points are advantageous, as it is easy to maintain the reaction temperature at the boiling point of the solvent and thus tune the heat flux into the reactor and the reaction speed. 1-methyl naphthalene has been found to be less preferred in some embodiments as a solvent for the DA-C step as it is not readily available with the required purity, has a strong odor, and may be brown in color. In one specific embodiment, the viscosity during the (a) linear oligomerization step remains less than 50, preferably 25, most preferably 10 centipoise, for example, as measured in accordance with ISO 3219 in a concentric or coaxial cylinder system. As described earlier, relatively low viscosities facilitate the removal of the condensation byproduct (e.g. the diol byproduct, such as ethylene glycol) in the (a) linear oligomerization step. For example, in the case of the known CDP process the oligomer is typically a solid with an intrinsic viscosity similar to fibre grade PEF (0.4-0.7). In the case of DA-C the oligomer is instead a low viscosity liquid at the oligomerization reaction temperature which typically has a viscosity close to that of ethylene glycol (e.g. 0.7 centipoise at 180° C.).

In another particular embodiment, the pressure during the (a) linear oligomerization step remains at least about 0.8, preferably about 0.9, most preferably 1 atm. As described earlier, the ability to operate the process at or near atmospheric pressure simplifies the design and operation of the reactor.

In one specific embodiment, the diol and/or diol byproduct are ethylene glycol and/or butylene glycol. These diols are often preferred as they are used in the production of PEF or PBF polyester polymers.

In another specific embodiment, the bifunctional furan-derivative having two functional groups is 2,5-furandicarboxylic acid (FDCA) or a derivative of FDCA. In an even more specific embodiment, the derivative of FDCA is a diester derivative, preferably dimethyl-, diethyl- or dipropyl-FDCA. These monomers are of interest as they may be renewable building blocks that can substitute for terephthalic acid in the production of polyesters.

In yet another specific embodiment, one or more catalysts are present during the (a) linear oligomerization step and/or the (b) distillation-assisted cyclization (DA-C) step, wherein the one or more catalysts are preferably transition metal catalysts, more preferably tin-based catalysts. The use of such catalysts advantageously make it possible to prepare (iv) cyclic polyester oligomer compositions under relatively mild conditions of temperature and time and thus with low discoloration and little thermal degradation.

In one specific embodiment, the iv. cyclic polyester oligomer composition comprising cyclic polyester oligomers having two to five repeat units and containing furanic units is directly polymerized without intermediate purification to yield a polyester polymer having an Mn of at least about 5,000 Dalton, preferably polymerized in the presence of a plasticizer (PL) and optionally-added catalyst, preferably a tin-based catalyst. Such a direct polymerization process allows for process simplification and lower cost infrastructure by the elimination of intermediate purification steps, equipment and reagents. Direct polymerization is possible in the present invention for the production of lower molecular weight fibre grade (FG) polyester polymer and/or in the polymerization of (iv) cyclic polyester oligomer composition having relatively low contents of higher melting point cyclic polyester oligomers, such as the C2 dimer species. If, on the other hand, the (iv) cyclic polyester oligomer composition has a relatively high content of higher melting point cyclic polyester oligomers, such as the C2 dimer species, the direct polymerization will often preferably take place in the presence of a plasticizer (PL).

In still another specific embodiment, the (iv) cyclic polyester oligomer composition comprising cyclic polyester oligomers having two to five repeat units and containing furan units is subsequently purified by selective precipitation to form a (iv.a) purified cyclic polyester oligomer composition by separating one or more linear oligomers and/or monomeric species.

Selective precipitation is often preferred as the high-melting C2 and C3 species readily precipitate apart from each other. Purified C3-rich (iv.a) purified cyclic polyester oligomer compositions with little or no high-melting C2 species may be readily polymerized; whereas it is generally necessary to add a plasticizer (PL) to all cyclic polyester oligomer compositions containing the high-melting C2 component in order to readily melt and polymerize them to produce bottle grade (BG) polyester polymer.

In a more specific embodiment, the separated one or more linear oligomers and/or monomeric species are recycled to produce a (iv.b) further cyclic polyester oligomer composition comprising cyclic polyester oligomers having two to five repeat units and containing furanic units, followed by another optional subsequent purification by selective precipitation to form yet another (iv.a) purified cyclic polyester oligomer composition by separating one or more linear oligomers and/or monomeric species. Recycling the separated linear oligomers and/or monomeric species enhances the productivity and economics of the process.

In another more specific embodiment, the (iv.a) purified cyclic polyester oligomer composition or the (iv.b) further cyclic polyester oligomer composition are polymerized to yield a polyester polymer having an Mn of at least about 5,000 Dalton, preferably polymerized in the presence of a plasticizer (PL) and optionally-added catalyst, preferably a tin-based catalyst. The use of these cyclic polyester oligomer products for polymerization, particularly without requiring additional treatment steps prior to the use in polymerization, contributes to the productivity of the process.

According to the invention, these objects are achieved also in one aspect by a process to prepare a cyclic polyester oligomer composition comprising a cyclic polyester oligomer having furanic units, wherein the process comprises:

a step of either:

(I) reacting a monomer component $C^1$ or $D^1$ in the presence of an optional catalyst and/or optional organic base in a ring closing oligomerization step

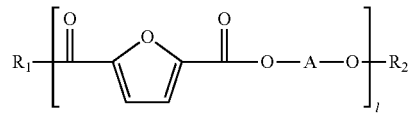

under conditions of a reaction temperature and reaction time sufficient to yield a cyclic polyester oligomer having furanic units of structure $Y^1$, wherein the monomer component $C^1$ comprises the structure $C^1$ and wherein each of the groups A is an optionally-substituted linear, branched or cyclic alkyl, phenyl, aryl, or alkylaryl, and wherein I is an integer from 1 to 100, preferably 2 to 50, most preferably 3 to 25, and wherein $R_1$=OH, OR, halogen, or O-A-OH, R=optionally substituted linear, branched or cyclic alkyl, phenyl, aryl or alkylaryl,

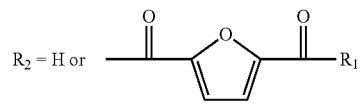

wherein the monomer component $D^1$ comprises the structures

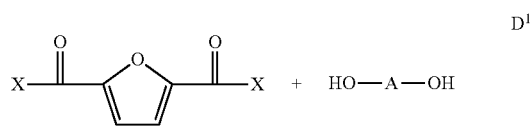

and wherein A is an optionally-substituted linear, branched or cyclic alkyl, phenyl, aryl, or alkylaryl, and wherein each of the groups X is an OH, a halogen, or an optionally-substituted alkyloxy, phenoxy, or aryloxy, and wherein the groups X are not OH when A is n-butyl, and wherein the structure $Y^1$ of the cyclic polyester oligomer having furanic units is

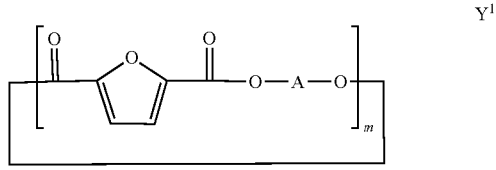

wherein m is an integer from 1 to 20, preferably 2 to 15, most preferably 3 to 10,

OR (II) reacting a monomer component $C^2$ or $D^2$ in the presence of an optional catalyst and/or optional organic base in a ring closing oligomerization step under conditions of a reaction temperature and reaction time sufficient to yield a cyclic polyester oligomer having furanic units of structure $Y^2$, wherein the monomer component $C^2$ comprises the structure

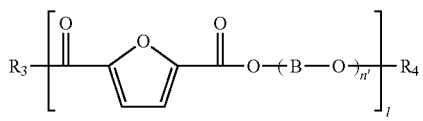

and wherein each of the groups B is an optionally-substituted linear, branched or cyclic alkyl, phenyl, aryl, or alkylaryl, wherein I is an integer as defined above, and wherein n' is an integer from 1 to 20, preferably 2 to 10, and wherein
$R_3$=OH, OR, halogen, or O—(B—O)$_{n'}$—H,
R=optionally substituted linear, branched or cyclic alkyl, phenyl, aryl or alkylaryl,

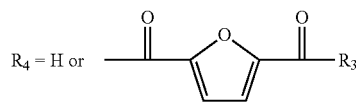

wherein the monomer component $D^2$ comprises the structures

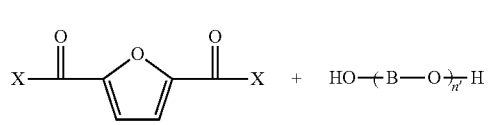

and wherein each of the groups X is an OH, a halogen, or an optionally-substituted alkyloxy, phenoxy, or aryloxy, each of the groups B is an optionally-substituted linear, branched or cyclic alkyl, phenyl, aryl, or alkylaryl, and n' is an integer as defined above,
and wherein the structure $Y^2$ of the cyclic polyester oligomer having furanic
units is

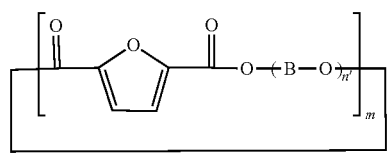

wherein each of the groups B is an optionally-substituted linear, branched or cyclic alkyl, phenyl, aryl, or alkylaryl, n' is an integer as defined above, and m is an integer from 1 to 20, preferably 2 to 15, most preferably 3 to 10,
AND
an optional subsequent step (III) in which linear oligomeric polyester species having furanic units are separated and removed from the cyclic oligomeric composition comprises one or more of the following sub-steps: (a) passing a mobile phase of the cyclic oligomeric composition through a stationary phase, preferably silica gel, (b) selective precipitation, (c) distillation, (d) extraction, (e) crystallization, (f) adding a zeolite and absorbing impurities onto the zeolite, (g) cooling the cyclic oligomeric composition in order to precipitate out cyclic polyester oligomers having furanic units, (h) adding an antisolvent in order to precipitate out cyclic polyester oligomers having furanic units, (i) separating zeolites having absorbed impurities from the cyclic oligomeric composition,
and wherein the reacting of the monomer component C1 or D1 or $C^2$ or $D^2$ in the presence of an optional catalyst and/or optional organic base in a ring closing oligomerization step is carried out by reactive distillation in the presence of a solvent, wherein the solvent is selected from the group consisting of an ionic liquid, an optionally-substituted napthalene, optionally-substituted aromatic compound, and their mixtures, and wherein an excess of a monomer component C1 or D1 or C2 or D2, preferably ethylene glycol, and a condensation byproduct, preferably water, alcohol, or a halogen acid or salt, and optionally some solvent are removed in the reactive distillation, and wherein a cyclic polyester oligomer composition is formed with a purity as measured by HPLC of EITHER (a) from about 95 to about 99% OR (b) about 99% or more during the reactive distillation.

In the present application, "reactive distillation" in the context of the claimed process to prepare a (iv) cyclic polyester oligomer composition comprising a cyclic polyester oligomer having furanic units is not to be confused with the classical term as used in chemical engineering, which may often imply a reactor setup using a distillation column of multiple separation trays that enable simultaneous separation and reaction of different components along the column or even a simple reactor, such as a round-bottom flask, equipped with a distillation column, such as those disclosed in US 2006/128935 A1 or in the article, Wasserabscheider by Stefanie Ortlanderl from 2004-11-01 in the RÖMPP Online-Enzyklopädie (XP055411633). The use of such conventional ("classical term") reactive distillation methods as well as conventional reactive-distillation columns embodied for simultaneous separation and reaction of components along the column is specifically disclaimed in the present invention. "Reactive distillation" as used in the present application and its claimed invention refers instead to the distillation-enhanced reaction, i.e. the previously discussed distillation-assisted cyclization (DA-C).

According to the invention, these further objects are achieved firstly by a cyclic polyester oligomer composition obtainable by the process, wherein the composition contains less than 5, preferably 3, most preferably 1 weight % of linear oligomeric polyester species based on the total weight of the composition. The cyclic polyester oligomer is used in accordance with the invention in the production of a polyester polymer.

In one embodiment the cyclic polyester oligomer composition is formed by reactive distillation with a purity as measured by HPLC of from about 95 to about 99%, and a ring-opening polymerization is carried out on the cyclic polyester oligomer composition, preferably in the absence of an optional added catalyst and preferably in the absence of an optional plasticizer, to yield a polyester polymer having furanic units and a weight average molecular weight, Mw, of from about 15,000 to 50,000, preferably 20,000 to 40,000, more preferably 25,000 to 35,000 Dalton as measured by Size Exclusion Chromatography (SEC) analysis.

In an alternative embodiment, the cyclic polyester oligomer composition is formed by reactive distillation with a purity as measured by HPLC of from about 95 to about 99%, the cyclic polyester oligomer composition prepared by reactive distillation is next further purified, preferably by selective precipitation, fractionation chromatography preferably over silica gel, extraction or crystallization, to yield a cyclic polyester oligomer composition having a substantially increased content of cyclic dimer polyester oligomer, preferably the cyclic dimer polyester oligomer having a double endotherm and preferably a melting point at about 370° C. as measured by DSC, and a ring-opening polymerization is subsequently carried out on the further purified cyclic polyester oligomer composition, optionally in the presence of an optional added catalyst, and in the presence of an added plasticizer to yield a polyester polymer having furanic units and a weight average molecular weight, Mw, of at least about 50,000, preferably 55,000, and more preferably 60,000 Dalton as measured by Size Exclusion Chromatography (SEC) analysis.

In still another alternative embodiment, the cyclic polyester oligomer composition is formed by reactive distillation with a purity as measured by HPLC of from about 95 to about 99%, and wherein the cyclic polyester oligomer composition is next further purified, preferably by selective precipitation, fractionation chromatography preferably over silica gel, extraction or crystallization, to yield a cyclic polyester oligomer composition having:
(i) a substantially reduced, preferably substantially eliminated content of cyclic dimer polyester oligomer, wherein the cyclic dimer polyester oligomer preferably has a double endotherm and preferably a melting point at about 370° C. as measured by DSC,
(ii) a substantially increased content of cyclic trimer polyester oligomer, wherein the cyclic polyester trimer preferably has a melting point of about 272° C. as measured by DSC, and a ring-opening polymerization is carried out on the further purified cyclic polyester oligomer composition, optionally in the presence of an optional added catalyst and preferably in the absence of an optional added plasticizer, to yield a polyester polymer having furanic units and a weight average molecular weight, Mw, of at least about 50,000, preferably 55,000, and more preferably 60,000 Dalton as measured by Size Exclusion Chromatography (SEC) analysis.

In another embodiment, wherein the cyclic polyester oligomer composition is formed by reactive distillation with a purity as measured by HPLC of from at least about 99%, and a ring-opening polymerization is carried out on the cyclic polyester oligomer composition, optionally in the presence of an optional added catalyst and preferably in the absence of an optional added plasticizer, to yield a polyester polymer having furanic units and a weight average molecular weight, Mw, of at least about 50,000, preferably 55,000, and more preferably 60,000 Dalton as measured by Size Exclusion Chromatography (SEC) analysis.

The present invention achieves these objects and provides a solution to this problem by a process to prepare a cyclic oligomer composition comprising a cyclic polyester oligomer having furanic units and having either structure $Y^1$ or $Y^2$. These cyclic oligomers advantageously are readily prepared with a high purity in relatively simple and scalable processes in a high conversion and with a low content of linear monomeric or oligomeric species having alcoholic and/or acidic end groups.

In the present invention, the terms "polyester" and "polymer" encompass linear and branched homopolymers and copolymers, wherein the copolymers may be random, alternating, block or graft.

These results are first of all surprisingly achieved by carrying out the cyclization reaction in the presence of a solvent by reactive distillation. The use of solvent strongly favours the formation cyclic oligomers at much lower conversion levels of end groups in dilute reaction systems versus that of bulk systems. Without wishing to be bound by a particular mechanism, the inventors believe this effect may be due to the presence of the solvent influencing the competition between the two independent reversible reactions of step growth polymerization and cyclization. The higher boiling aromatic solvents have been found to provide good solubility, but preferably the more volatile ones such as xylenes are selected in order to ease their subsequent removal.

Another preferred solvent for the cyclization is dichlorobenzene because of its lower boiling point, and it is colorless and remains liquid at room temperature. Diphenyl ether is yet another preferred solvent as it is also colorless and does not have an odor. Solvents that are colorless and odourless are preferred because they will not impart color or odor to the cyclic oligomer or its subsequent polymer. Odor is also quite undesirable for the local processing environment and general environment, particularly for large-scale manufacturing plants. Solvents that remain liquid at room temperature are preferred because one can readily cool the crude product from the cyclization in order to precipitate the product.

Solvents having lower boiling points like dichlorobenzene are advantageous, as it is easy to control and maintain the reaction temperature at the boiling point of the solvent, and thus one can readily tune the heat flux into the reactor and thus the reaction speed.

1-methyl naphthalene has been found not to be preferred in some embodiments as a solvent for the cyclization as it not readily available in large quantities in the required purity, and it has a strong odor and often is brownish in color.

The cyclic oligomers tend to have a lower solubility in the solvent than the linear oligomers or especially the monomers or other low molecular weight species (less than 100 g/mol) having acidic and/or alcoholic functional groups. Thus the cyclic may additionally or alternatively be removed by cooling the reaction product mixture and/or adding an anti-solvent. Aliphatic hydrocarbon solvents are generally preferred as anti-solvent, and the flame point of these compounds—and thus their hazardousness—decreases with increasing chain length. Therefore heptane or longer species will often be preferred over hexane as anti-solvent. Cooling the mixture so that the cyclic species precipitate earlier is often preferred, as most anti-solvents do not have a high selectivity for the cyclic versus linear species. Cooling to temperatures of less than 120° C. will often be preferred in many embodiments, as many cyclic oligomer species, such as the cyclic dimer, preferably precipitate at temperatures below 130° C.

It is noted that in this application, "optionally-substituted" refers to chemical substituents that are different from hydrogen, alkyl, aryl or alkylaryl groups. Such optional substituents will be generally inert during the ring-closing oligomerization step and may be for example, halogens or ethers.

In the present invention, a "catalyst" refers to an inorganic or metal-containing compound such as an organometallic species or a metal salt; whereas an "organic base" refers to a non-metallic and basic organic species.

In another preferred embodiment of the process, the optional catalyst is either absent or it is present as a metal alkoxide or metal carboxylate, preferably one of tin, zinc, titanium, calcium, iron, magnesium, aluminium or their mixtures. The lack of a catalyst reduces the cost of raw materials and simplifies the purification and further use of the cyclic polyester oligomer. However, some metal-based catalysts have been found by the inventors to be highly effective in the process of the invention thus allowing the cyclic polyester oligomer compositions to be prepared under relatively mild conditions of temperature and time. This then improves productivity and minimizes degradation and discoloration in the process. In addition, in some embodiments, a non-metallic catalyst is used. For example, non-metallic catalysts such as those used for PLA production from lactide may be used. In specific embodiments, the non-metallic catalyst may be selected from one or more of the group consisting of N-heterocyclic carbenes (NHC); tris(pentafluorophenyl)borane ($B(C_6F_5)_3$); 1,3,4-triphenyl-4,5-dihydro-1H-1,2,4-triazol-5-ylidene carbine; and DMAP/DMAP.HX (where XH=$CF_3SO_3H$, $CH_3SO_3H$, HCl, $(F_3CSO_2)_2NH$) or DMAP/DMAPCH$_3$.X (where X=I—, —PF$_6$).

In some embodiments, it is preferable to use "greener" or more environmentally-friendly and less toxic catalysts such as those based on iron, calcium, zinc and magnesium. Suitable organic monocarboxylic iron complexes include those of iron and acetic acid, butyric acid, isobutyric acid, dichloroacetic acid, and trifluoroacetic acid. Iron acetate, iron trifluoroacetate, and iron isobutyrate complexes are often preferred as efficient catalysts. Suitable organic amino calcium catalysts (Ca/PO and Ca/EO) may be prepared by reacting calcium ammoniate Ca(NH3)6 with propylene oxide and ethylene oxide, respectively. Other suitable calcium catalysts include calcium dialkoxides such as calcium dimethoxide or calcium diethoxide.

In a preferred embodiment of the solvent of the process, the ionic liquid is an ionic liquid in which the cation does not contain acidic protons, more preferably the ionic liquid is N-methyl-N-alkylpyrrolidinium bis(trifluoromethanesulfonyl)imide ($PYR_{1R}TFSI$).

In another preferred embodiment of the solvent of the process, the optionally-substituted napthalene is selected from the group consisting of naphthalene, 1-methylnaphthalene, and 2-methylnaphthalene.

In still yet another preferred embodiment of the solvent of the process, the optionally-substituted aromatic compound is diphenyl ether, dichlorobenzene, or a xylene, preferably p-xylene.

The sub-step of cooling of the cyclic oligomeric composition in order to precipitate out cyclic polyester oligomers having furanic units is preferably carried out under temperature and time conditions of 50 to 125° C. and 5 to 180 min, preferably 60 to 110° C. and 30 to 120 min, more preferably 80 to 100° C. and 45 to 90 min.

The sub-step of adding an antisolvent in order to precipitate out cyclic polyester oligomers having furanic units is carried out by adding an antisolvent selected from one or more of hydrocarbons or monoesters in amounts of 5 to 95, preferably 25 to 75, more preferably 30 to 60 weight %. In preferred embodiments, the hydrocarbon is an alkane, preferably hexane, and the ester is a salicylate, preferably a methyl salicylate.

Another aspect of the invention concerns a cyclic polyester oligomer composition obtainable, preferably obtained, by a process according to the invention, wherein the composition contains: (i) a residual solvent in a concentration of less than 5, preferably 2, more preferably 1 wt %, and the residual solvent is selected from the group consisting of an ionic liquid, an optionally-substituted napthalene, optionally-substituted aromatic compound, and their mixtures; (ii) linear oligomeric polyester species having furanic units and present in a concentration of less than 5%, preferably 3, most preferably 1 wt %; and (iii) optionally a zeolite, in a concentration of less than of less than 5, preferably 2, more preferably 1 wt %, wherein the earlier stated weight percentages are relative to the total weight of the cyclic polyester oligomer composition.

The linear oligomeric polyester species having furanic units in the present invention typically contain from 2 to 50, preferably 2 to 20, more preferably 2 to 10 monomeric repeat units (an ester linkage is formed by a reaction of a diacid or diester monomer and a diol in the present invention). The composition containing such low levels of linear species is advantageous in that the subsequent polymerization may be carried out efficiently and reproducibly. Large and/or variable levels of linear species in the cyclic oligomer composition may change the subsequent polymerization stoichiometry and thus affect the obtainable molecular weight upon polymerization. In addition, acidic, alcoholic, or ester end groups of linear oligomeric or monomeric species may react to disadvantageously release volatile species during polymerization. Furthermore, reactive acidic species may act to quench the basic catalysts and/or be corrosive to processing equipment.

In a preferred embodiment of the composition, the content of residual monomer components, such as $C^1$, $D^1$, $C^2$, or $D^2$, in the cyclic polyester oligomer composition is less than 5, preferably 3, and most preferably 1 weight percent based on the total weight of the composition.

In one preferred embodiment of the cyclic polyester oligomer composition, the cyclic polyester oligomer composition contains a halogenated impurity, preferably an acid chloride and/or its residue. A residue is defined here as a reaction product or byproduct, for example, a halogen acid such as HCl or a halogen salt such as a chloride salt. Such impurities are a byproduct of the use of acid halide reactants, such as acid chlorides, which have both more favourable kinetics and equilibrium in the production of the oligomer composition than does the reaction of a carboxylic acid with an alcohol. However halogenated species may be corrosive and thus require special expensive construction materials for the subsequent polymerization plant. Therefore, their content in the cyclic polyester oligomer composition of the invention will preferably be kept low, e.g. by removal during the subsequent separation and removal step.

In another preferred embodiment of the cyclic polyester oligomer composition, the composition comprises the specific cyclic polyester oligomer having furanic units and of structure $Y^{1'}$

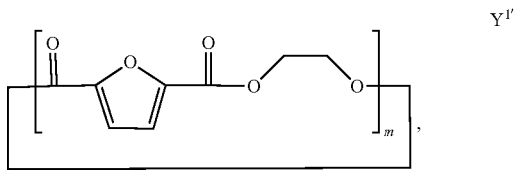

wherein m is an integer from 1 to 20, preferably 2 to 15, most preferably 3 to 10. This embodiment is a suitable raw material for producing poly(2,5-ethylene furandicarboxylate) (PEF), and thus has the advantages previously discussed in relationship to the process to produce this oligomer composition.

In an alternative preferred embodiment of the cyclic polyester oligomer composition, the composition comprises the specific cyclic polyester oligomer having furanic units and of structure $Y^{1''}$

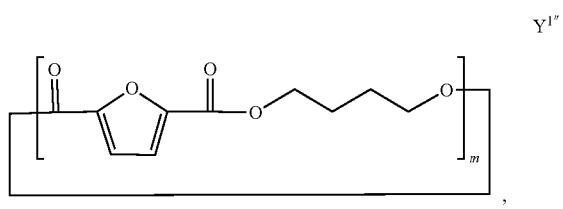

wherein m is an integer from 1 to 20, preferably 2 to 15, most preferably 3 to 10. This embodiment is a suitable raw material for producing poly(2,5-butylene furandicarboxylate) (PBF), and thus has the advantages previously discussed in relationship to the process to produce this oligomer composition.

Another aspect of the invention is a process to produce a polyester polymer comprising (i) the process of the invention to prepare a cyclic oligomer composition comprising a cyclic polyester oligomer having furanic units together with (ii) a subsequent polymerization step to produce a polyester polymer.

One aspect of the invention is a polyester polymer composition obtainable, preferably obtained, by the process of the present invention, wherein the composition contains: (i) optionally a plasticizer selected from the group consisting of an optionally-substituted phenyl ether, an ionic liquid, an optionally-substituted xylene, a polyether, and their mixtures, (ii) a cyclic polyester oligomer having furanic units, preferably one characterized by the presence of an endotherm at about 370° C., more preferably a double endotherm at about 285° C. and about 370° C., and (iii) EITHER: (a) a PEF polymer OR (b) a PBF polymer.

This unique polyester polymer composition may be readily identified by the presence of the residual unreacted cyclic polyester oligomer species having a melting point of about 370° C. (or double endotherm) by DSC analysis of either the polyester polymer composition containing the residual cyclic polyester oligomer itself or of the cyclic polyester oligomer after its extraction and/or separation from the polyester polymer composition. Similarly, the presence of residual plasticizer may be determined by FTIR or NMR spectroscopic analysis of the polyester polymer composition. Alternatively, the presence may be determined by spectroscopic or chromatographic methods such as HPLC or GC after extraction of the residual plasticizer from the polyester polymer composition.

In a preferred embodiment of the process, the subsequent polymerization is carried out in the presence of a plasticizer. In an alternative embodiment of this aspect of the invention, the subsequent polymerization in the presence of a plasticizer is carried out on a cyclic oligomer composition obtainable, preferably obtained, by processes known in the art, preferably as disclosed in the earlier discussed WO2014/139603.

According to the present invention, a plasticizer is a compound which is capable of decreasing the melting point and/or the viscosity of a cyclic polyester oligomer having furanic units, preferably a cyclic dimer. In preferred embodiments, the amount of plasticizer during the polymerization is sufficient to reduce the melting point of the initial unreacted cyclic oligomer composition by at least 10, preferably 25, more preferably 50, most preferably about 75° C. In preferred embodiments, the amount of plasticizer during the polymerization is sufficient to reduce the initial melt viscosity of the reaction mixture comprising the cyclic oligomer composition by at least 10, preferably 25, more preferably 50%. In certain other preferred embodiments, the amount of plasticizer is from 1 to 75, preferably 5 to 60, more preferably 10 to 50 mass, most preferably 15 to 40 mass % based on the mass of the initial cyclic polyester oligomer composition. The melt viscosity may be measured using a rheometer according to methods commonly known in the art. In a specifically preferred embodiment, the plasticizer is one or more selected from the group consisting of a supercritical fluid, an optionally-substituted phenyl ether, an ionic liquid, an optionally-substituted xylene, a polyether, and their mixtures. In a more specifically preferred embodiment of the process, the supercritical fluid is carbon dioxide or the polyether is a glyme, preferably tetraethylene glycol dimethyl ether. In an alternative embodiment, the plasticizer is a polyester polymer of the cyclic polyester oligomer, preferably a PEF polymer, preferably one having a molecular weight of about 15,000 to 30,000 g/mol (melting point about 220° C.), or a PEF oligomer, preferably one having a molecular weight of about 1,000 to less than about 15,000 g/mol. The previously stated molecular weights are measured by SEC relative to polystyrene standards. In yet another preferred embodiment, mixtures of any of the above-mentioned plasticizers are used.

The presence of the plasticizer has several beneficial effects. First of all, some of the cyclic species, such as the cyclic dimer, have quite high melting points, which the presence of the plasticizer then effectively reduces. Thus, most cyclic oligomer compositions will not melt at preferred temperatures below 300 C., above which the thermal degradation of both the oligomers and their polymer product cause significant colour formation and reduction of the achieved molecular weight in the polymer product. The plasticizer beneficially minimizes then the thermal profile (temperature and/or time) of the reactant cyclic oligomer composition during the initial melt up and any holding of the composition prior to its melt polymerization. In addition, the plasticizer facilitates the polymerization of the cyclic oligomer compositions at temperatures well below their melting point and thus under milder conditions.

Furthermore, many of the desirable polymerization catalysts are solid rather than liquids. Examples include cyclic stannoxane, which readily yields high molecular weight polymers for commercial applications, as well as the metal oxides such as $Sb_2O_3$ and $Bi_2O_3$, which provide polymer products having reduced colour versus that obtainable with tin-based catalysts. The inert plasticizer facilitates the polymerization by promoting the intimate contacting and mixing between the cyclic oligomer compositions and these solid state polymerization catalysts.

In another aspect of the invention, the ring-opening polymerization in the presence of a plasticizer as described above and disclosed in this application may also be carried out on known cyclic oligomer compositions comprising a cyclic polyester oligomer having furanic units, such as those disclosed in EP2931784 (A1).

In yet another aspect of the ring-opening polymerizations in the presence of a plasticizer as described above and disclosed in this application, the polymerization is carried out in the presence of one or more anti-oxidants such as substituted phenols and derivatives of phenylenediamine. Suitable anti-oxidants include IRGANOX 1098, which is the trade name for benzenepropanamide, N,N'-1,6-hexanediylbis [3,5-bis(1,1-dimethylethyl)-4-hydroxy; a sterically hindered phenolic antioxidant such as IRGANOX 1076, which has the formula Octadecyl-3-(3,5-di-tert. butyl-4-hydroxyphenyl)-propionate.

A related aspect of the invention is the use of the cyclic polyester oligomer composition of the invention in the production of a polyester polymer. This polymerization process and this use advantageously utilize the desirable properties of the oligomer composition as a raw material in a polymerization process, such as the favourable kinetics, lack of corrosive acidic species, and lack of formation of significant quantities of volatile species during the polymerization.

One skilled in the art will understand that the combination of the subject matters of the various claims and embodiments of the invention is possible without limitation in the invention to the extent that such combinations are technically feasible. In this combination, the subject matter of any one claim may be combined with the subject matter of one or more of the other claims. In this combination of subject matters, the subject matter of any one process claim may be combined with the subject matter of one or more other process claims or the subject matter of one or more composition claims or the subject matter of a mixture of one or more process claims and composition claims. By analogy, the subject matter of any one composition claim may be combined with the subject matter of one or more other composition claims or the subject matter of one or more process claims or the subject matter of a mixture of one or more process claims and system claims. One skilled in the art will also understand that the combination of the subject matters of the various embodiments of the invention is also possible without limitation in the invention to the extent that such combinations are technically feasible.

BRIEF DESCRIPTION OF THE DRAWINGS

The invention will be explained in more detail hereinafter with reference to the drawings.

DETAILED DESCRIPTION OF THE EMBODIMENTS

The claimed invention relates to a process to prepare a cyclic polyester oligomer composition comprising a cyclic polyester oligomer having furanic units, such as that known from WO2014/139603 (A1) or EP 16191553.3, both of which are hereby incorporated by reference.

The cyclic polyester oligomer composition of the current invention is not specifically limited and it may comprise other components in addition to the polyester polymer having furanic units and comprising the structure $Y^1$ or $Y^2$. For example, the cyclic polyester oligomer composition may additionally comprise small amounts of one or more unreacted and/or unremoved reaction components such as a monomer component (unreacted diacid, diol, or acidol reagents), a catalyst, a templating agent, a base, a catalyst quencher, a solvent, used in the preparation of the cyclic polyester oligomer. The amount of these impurities in the cyclic polyester oligomer will preferably be less than 10, more preferably less than 5, even more preferably less than 3, and most preferably less than 1 weight % based on the total weight of the cyclic polyester oligomer.

In addition, the cyclic polyester oligomer composition may additionally comprise low levels of impurities introduced as a contaminant in one of the reaction components or formed due to a side reaction during the ring-closing oligomerization step or an optional additional step such as a subsequent devolatilization step. Examples of such impurities are linear oligomeric polyester species having furanic units. Finally, the cyclic polyester oligomer composition may additionally comprise additional components such as typical monomer additives added during production or prior to use such as stabilizers against oxidation, thermal degradation, light or UV radiation. One skilled in the art will understand that blends with other monomers in order to combine the favorable properties of different monomers are also contemplated as being within the scope of the present invention.

In one embodiment, the content of diacid, diol, or acidol monomers in the cyclic polyester oligomer composition is less than 5 wt %, preferably less than 3 wt %, more preferably less than 1 wt %. In the present application, the content of diacid, diol, or acidol monomers refers to their content as measured by the extraction of soluble species followed by GC-MS analysis.

Figure 1:
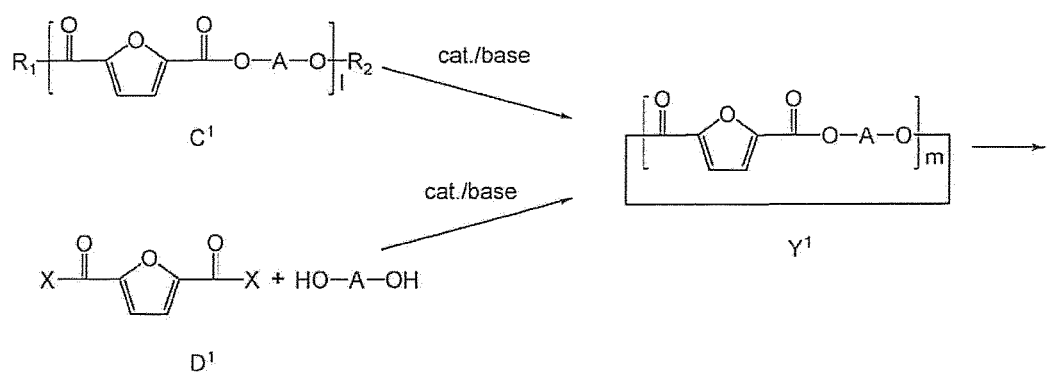
FIG. 1 shows a reaction scheme for the synthesis of a cyclic polyester oligomer having furanic units of structure $Y^1$ from the reaction of a monomer component $C^1$ or $D^1$ in a ring closing oligomerization step.

As shown in FIG. 1, the process of the invention to prepare the cyclic oligomer composition comprising a cyclic polyester oligomer of structure $Y^1$ having furanic units comprises the step of (I) reacting a monomer component $C^1$ or $D^1$ in the presence of an optional catalyst and/or optional organic base in a ring closing oligomerization step under conditions of a reaction temperature and reaction time sufficient to yield a cyclic polyester oligomer having furanic units of structure $Y^1$, wherein the monomer component $C^1$ comprises the structure

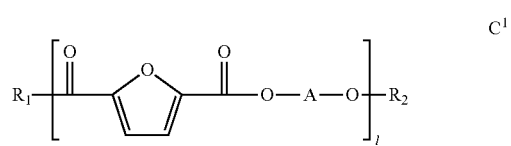

and wherein each of the groups A is an optionally-substituted linear, branched or cyclic alkyl, phenyl, aryl, or alkylaryl, and wherein l is an integer from 1 to 100, preferably 2 to 50, most preferably 3 to 25, and wherein $R_1$=OH, OR, halogen, or O-A-OH, R=optionally substituted linear, branched or cyclic alkyl, phenyl, aryl or alkylaryl,

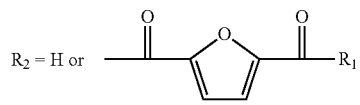

wherein the monomer component $D^1$ comprises the structures

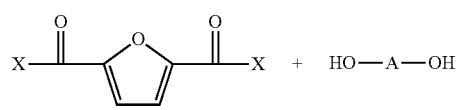

and wherein A is an optionally-substituted linear, branched or cyclic alkyl, phenyl, aryl, or alkylaryl, and wherein each of the groups X is an OH, a halogen, or an optionally-substituted alkyloxy, phenoxy, or aryloxy, and wherein the groups X are not OH when A is n-butyl.

Figure 2:
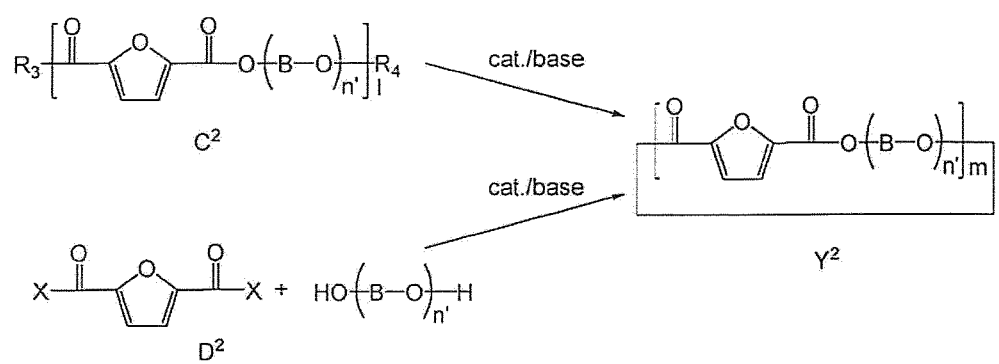
FIG. 2 shows a reaction scheme for the synthesis of a cyclic polyester oligomer having furanic units of structure $Y^2$ from the reaction of a monomer component $C^2$ or $D^2$ in a ring closing oligomerization step.

As shown in FIG. 2, the process of the invention to prepare the cyclic oligomer composition comprising a cyclic polyester oligomer of structure $Y^2$ having furanic units comprises the step of (II) reacting a monomer component $C^2$ or $D^2$ in the presence of an optional catalyst and/or optional organic base in a ring closing oligomerization step under conditions of a reaction temperature and reaction time sufficient to yield a cyclic polyester oligomer having furanic units of structure $Y^2$, wherein the monomer component $C^2$ comprises the structure

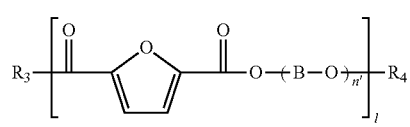

and wherein each of the groups B is an optionally-substituted linear, branched or cyclic alkyl, phenyl, aryl, or alkylaryl, wherein l is an integer as defined above, and wherein n' is an integer from 1 to 20, preferably 2 to 10, and wherein $R_3$=OH, OR, halogen, or O—(B—O)$_{n'}$—H, R=optionally substituted linear, branched or cyclic alkyl, phenyl, aryl or alkylaryl,

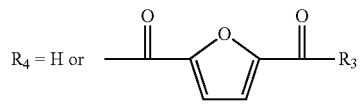

the monomer component $D^2$ comprises the structure

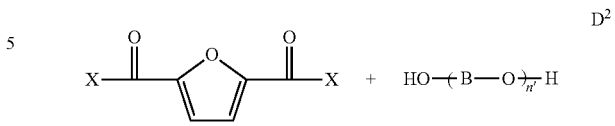

and wherein each of the groups X is an OH, a halogen, or an optionally-substituted alkyloxy, phenoxy, or aryloxy, each of the groups B is an optionally-substituted linear, branched or cyclic alkyl, phenyl, aryl, or alkylaryl, and n' is an integer as defined previously for $Y^2$.

In a step (III) subsequent to either (I) or (II), linear oligomeric polyester species having furanic units are separated and removed from the cyclic oligomeric composition.

Figure 3:
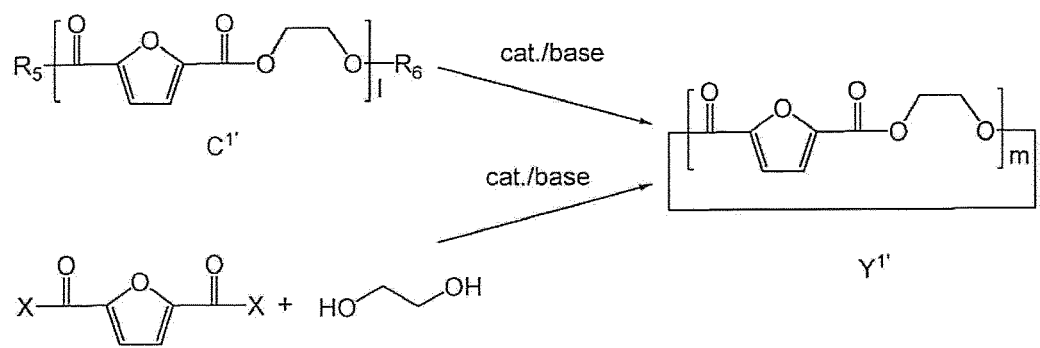
FIG. 3 shows a reaction scheme for the synthesis of a specific cyclic polyester oligomer useful in the production of PEF and having furanic units and of structure $Y^{1'}$ from the reaction of a specific monomer component $C^{1'}$ or $D^{1'}$ in a ring closing oligomerization step.
Figure 4:
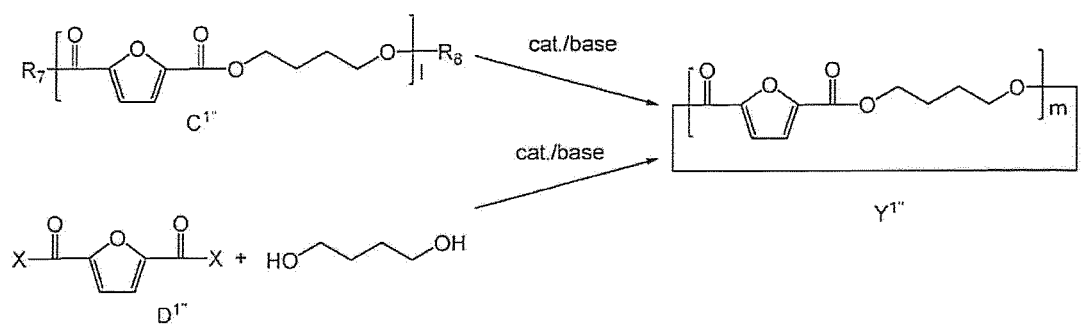
FIG. 4 shows a reaction scheme for the synthesis of a specific cyclic polyester oligomer useful in the production of PBF and having furanic units and of structure $Y^{1''}$ from the reaction of a specific monomer component $C^{1''}$ or $D^{1''}$ in a ring closing oligomerization step.

FIG. 3 shows a reaction scheme for the synthesis of a specific cyclic polyester oligomer useful in the production of PEF and having furanic units and of structure $Y^{1'}$ from the reaction of a specific monomer component $C^{1'}$ or $D^{1'}$ in a ring closing oligomerization step, and FIG. 4 shows a reaction scheme for the synthesis of a specific cyclic polyester oligomer useful in the production of PBF and having furanic units and of structure $Y^{1''}$ from the reaction of a specific monomer component $C^{1''}$ or $D^{1''}$ in a ring closing oligomerization step, wherein l, m and n are as previously defined for the case of both figures.

Unless specifically indicated otherwise, conventional ring-closing oligomerization processes and their various reagents, operating parameters and conditions, such as that known from WO2014/139603 (A1), may be used in the processes according to the invention in preparing the cyclic polyester oligomers having the structures $Y^1$, $Y^2$, $Y^{1'}$, or $Y^{1'''}$.

The conditions of a reaction temperature and reaction time sufficient to yield a cyclic polyester oligomer having furanic units in the ring-closing oligomerization step are not specifically limited. Sufficient here means that the reaction temperature and time are sufficient to cause a ring-closing reaction to occur such that an oligomer having the claimed values of m is produced from the monomer components. One skilled in the art will understand that appropriate specific reaction temperatures and reaction times may vary somewhat due to the interaction between the reaction temperature and time.

For example, increasing the reaction temperature may allow the reaction to take place in a shorter time, or increasing the reaction time may allow lower reaction temperatures to be used. Lower reaction temperatures and/or shorter reaction times may be appropriate if a lower molecular weight cyclic polyester oligomer is to be produced and/or a lower conversion of monomer component to oligomer may be tolerated. Alternatively, higher reaction temperatures and/or longer reaction times may be appropriate if a higher molecular weight cyclic polyester oligomer is to be produced and/or a higher conversion of monomer component is desired.

Furthermore, the use of more effective catalysts or bases or a higher concentration of catalyst or organic base may allow milder reaction conditions (e.g. lower reaction temperatures and shorter reaction times) to be used. Conversely the presence of impurities, particularly catalyst-quenching or chain-stopping impurities may require more intensive reaction conditions.

In preferred embodiments of the DA-C process, the pressure in the linear oligomerization step is typically between 0.05-1.2 bar, preferably between 0.5-1.1 bar, and most preferably between 0.8 and 1.05 bar. The temperature in the linear oligomerization step is typically between about 140 and about 300° C., preferably between about 160° C. and about 280° C., and most preferably between about 170° C. and 220° C. The reaction time will generally be between 0.5 and 2 h, preferably between 0.75 and 1.5 h, and most preferably between 0.9 and 1.1 h. The molar catalyst concentration with respect to the monomer, such as the dimethyl ester, meFDCA, is typically between 0.01 and 5%, preferably between 0.02 and 3%, most preferably between 0.05 and 1%.

In one embodiment the cyclization reaction temperature is from 100 to 350, preferably 150 to 300, most preferably 180 to 280° C., and the reaction time is from 30 to 600, preferably 40 to 400, most preferably 50 to 300 minutes. In certain specific embodiments, the various specific temperature and time range combinations obtained by combining any of these disclosed ranges may be used. In a more preferred embodiment, these temperature and/or time ranges are used in the ring closing oligomerization step with monomer components $C^1$ or $C^2$.

In another embodiment the cyclization reaction temperature is from −10 to 150, preferably −5 to 100, most preferably 0 to 80° C., and the reaction time is from 5 to 240, preferably 10 to 180, most preferably 15 to 120 minutes. In certain specific embodiments, the various specific temperature and time range combinations obtained by combining any of these disclosed ranges may be used. In a more preferred embodiment, these temperature and/or time ranges are used in the ring closing oligomerization step with monomer components $D^1$ or $D^2$.

In the execution of the present invention, any catalyst which is able to catalyze the ring-closing oligomerization to form cyclic polyester oligomers may be used. Suitable catalysts for use in the present invention are those known in the art for polymerization of cyclic esters, such as an inorganic base, preferably a metal alkoxide, a metal carboxylate, or a Lewis acid catalyst. The Lewis acid catalyst may be a metal coordination compound comprising a metal ion having more than one stable oxidation state. Of this class of catalysts, the tin- or zinc-containing compounds are preferred, of which their alkoxides and carboxylates are more preferred, and tin octoate is the most preferred catalyst.

The ring-closing oligomerization step preferably takes place in the presence of an optional organic base. The organic base is not specifically limited, and, it may be an inorganic or organic base. In one embodiment, it has the general structure E, and in other embodiments it is an alkyl amine such as triethylamine or it is pyridine. In still other embodiments, it is a combination of E and an alkyl amine. In this application, a "catalyst" refers to an inorganic or metal-containing compound such as an organometallic species or a metal salt; whereas an "organic base" refers to a non-metallic and basic organic species.

Specific combinations of catalysts and bases may be particularly effective, and their use may be preferred. In one preferred embodiment, the catalyst is a tin, zinc, titanium, or aluminum alkoxide or carboxylate, and the organic base is DABCO (CAS No. 280-57-9) or DBU (CAS No. 83329-50-4), preferably together with triethyl-amine. The monomer component may be in the solid phase when it is mixed with the catalyst and/or organic base.

However, bringing the monomer component into the molten phase or a liquid phase using a solvent and then adding the catalyst and/or organic base afterwards is preferred.

The amount of catalyst and/or organic base in the process of the invention is not specifically limited. In general, the amount of catalyst and/or organic base is sufficient to cause a ring-closing oligomerization step to occur for the selected reaction temperature and time such that an oligomer having the claimed values of 1 is produced from the monomer components. In one embodiment, the catalyst and/or organic base is present, and the catalyst is present in an amount relative to the total weight of the monomer components of from 1 ppm to 1 weight %, preferably from 10 to 1,000 ppm, more preferably from 50 to 500 ppm, and the organic base is present in a stoichiometric ratio of from 0.5 to 6, preferably 1 to 4, more preferably 2 to 3 mol relative to 1 mol of all monomer component species used as a reactant in the process. The concentration of the catalyst and the organic base may be readily determined by the masses or mass flow rates used of these reagents relative to that of the monomer components.

In preferred embodiments of the DA-C process, the pressure in the distillation-assisted cyclization (DA-C) step is typically between 0.5 and 5 bar, preferably between 0.8 and 3 bar, and most preferably between 1 and 2 bar. The temperature is typically between 140-300° C., preferably between 180° C.-240° C., and most preferably between 190° C. and 210° C. The reaction time is typically between 1 and 10 h, preferably between 2 and 8 h, and most preferably between 3 and 7 h. The concentration of the oligomer composition in this distillation-assisted cyclization (DA-C) step is typically between about 1 and about 500 g/L, preferably between about 5 and about 100 g/L, most preferably about 10 to about 20 g/L.

The process to prepare the cyclic polyester oligomer composition of the invention is not specifically limited, and it may be conducted in a batch, semi-continuous, or continuous manner. Oligomerization processes suitable for preparing the cyclic polyester oligomer composition of the invention can be divided into two groups, solution oligomerization in the presence of a solvent, or oligomerization in the substantial absence of solvent, e.g., melt oligomerization, carried out at a temperature above the melting temperature of the monomer components and oligomeric species.

As the presence of substantial amounts of unreacted monomer component, linear oligomers, or other low molecular weight species, particularly those having acidic or other free OH groups, in the cyclic polyester oligomer composition may detrimentally affect the storage stability and/or polymerization processing behaviour of the oligomer composition, the cyclic polyester oligomer composition is subjected to a step in which linear oligomeric polyester species, as well as optionally other impurities, such as low molecular weight (e.g. less than 100 g/mol) species having acidic and/or hydroxyl groups, are removed.

The step in which linear oligomeric polyester species having furanic units, as well as optionally other impurities, are separated and removed from the cyclic polyester oligomer composition of the invention is not specifically limited. Examples of other impurities may be unreacted starting materials such as diacids or diols or residual reagents such as bases or their residues (e.g. amine residues). Separation and purification methods are well-known in the art, for example, as disclosed in Purification of Laboratory Chemicals, Sixth Ed., by W. E. Armarego and C. L. L. Chai, published in 2009 by Elsevier, Oxford (ISBN-13: 978-1856175678), and The Molecular World, Separation, Purification and Identification by L. E. Smart, published in 2002 by the Royal Society of Chemistry, Cambridge (ISBN: 978-1-84755-783-4).

Unless specifically indicated otherwise, conventional separation and purification processes and their various apparatuses, operating parameters and conditions may be used in the processes according to the invention in preparing the cyclic polyester oligomers of structures $Y^1$, $Y^2$, $Y^{1'}$ or $Y^{1''}$ and their compositions.

In one embodiment the separation step in which linear oligomeric species and optionally other impurities are removed comprises one or more separation sub-steps of passing a mobile phase of the cyclic oligomeric composition through a stationary phase, selective precipitation, distillation, extraction, crystallization or their combinations.

In the cyclic polyester oligomer composition product that is obtained after the separation step, linear oligomeric polyester species having furanic units are generally present in an amount of less than 5 wt. %, more in particular in an amount of less than 3 wt. %, still more in particular in an amount of less than 1 wt. % relative to the total weight of the cyclic polyester oligomer composition. The content of linear oligomeric polyester species having furanic units in the cyclic polyester oligomer composition of the invention may be readily determined by conventional methods. For example, the content of linear oligomeric species may be determined by electrospray mass spectrometry, matrix-assisted laser desorption/ionization (MALDI) mass spectrometry, high-performance liquid chromatography (HPLC) method coupled to mass spectronomy, and gel filtration chromatography. In the present application and invention, the concentration of linear oligomeric polyester species having furanic units refers to the concentration as determined by HPLC.

In a preferred embodiment of the composition, the content of residual monomer components, such as $C^1$, $D^1$, $C^2$, or $D^2$, in the cyclic polyester oligomer composition is less than 5, preferably 3, and most preferably 1 weight percent based on the total weight of the composition. The content of such residual monomer (or solvent) components may be determined by FTIR or NMR spectroscopic analysis of the composition. Alternatively, the content may be determined by chromatographic methods such as HPLC or GC. In the present application and invention, the concentration of residual monomer (and solvent) components refers to the concentration as determined by HPLC.

The invention relates to a cyclic polyester oligomer composition comprising a cyclic polyester oligomer having furanic units, wherein the structure of the cyclic polyester oligomer having furanic units is $Y^1$ or $Y^2$, and wherein the polyester polymer composition is obtainable with the above-described method. The cyclic polyester oligomer composition is characterized in that the composition contains: (i) a residual solvent in a concentration of less than 5, preferably 2, more preferably 1 wt %, and selected from the group consisting of an ionic liquid, an optionally-substituted napthalene, optionally-substituted aromatic compound, and their mixtures, (ii) linear oligomeric polyester species having furanic units and present in a concentration of less than 5%, preferably 3, most preferably 1 wt %, and (iii) optionally a zeolite, in a concentration of less than of less than 5, preferably 2, more preferably 1 wt %, wherein the weight percentages are relative to the total weight of the cyclic polyester oligomer composition. Such oligomer compositions can answer most requirements posed by the current polymerization applications.

In another preferred embodiment, the composition comprises a halogenated impurity, preferably an acid chloride and/or its residue. Methods of detection of halogenated impurities in oligomers are well-known and include combustion ion chromatography (IC), optical atomic spectroscopy, and X-ray fluorescence analysis (XRF). However halogenated species may be corrosive and thus require special expensive construction materials for the subsequent polymerization plant. Therefore, their content in the cyclic polyester oligomer composition of the invention will preferably be kept low, e.g. by removal during the subsequent separation and removal step.

In a preferred embodiment of the cyclic polyester oligomer composition, the specific cyclic polyester oligomer having furanic units is one of structure $Y^{1'}$ or $Y^{1''}$, wherein m is an integer from 1 to 20, preferably 2 to 15, most preferably 3 to 10.

Yet another aspect of the present invention is a process to produce a polyester polymer comprising (i) the process of the invention to prepare a cyclic oligomer composition comprising a cyclic polyester oligomer having furanic units together with (ii) a subsequent polymerization step to produce a polyester polymer. Suitable ring opening polymerization catalysts, process conditions, apparatuses and methods are those disclosed in the earlier discussed WO2014/139602, which is hereby incorporated by reference. Related to this aspect is the aspect of the use of the cyclic polyester oligomer composition of the invention in the production of a polyester polymer. Preferred embodiments of this process or use are those in which the polyester polymer is a PEF polymer or a PBF polymer.

Particularly preferred is a polyester polymer composition obtainable, preferably obtained, by the ring opening polymerization process of the invention, wherein the composition contains: (i) a plasticizer selected from the group consisting of an optionally-substituted phenyl ether, an ionic liquid, an optionally-substituted xylene, a polyether, and their mixtures, (ii) a cyclic polyester oligomer having furanic units, preferably one characterized by the presence of an endotherm at about 370° C., more preferably a double endotherm at about 285° C. and about 370° C., and (iii) EITHER: (a) a PEF polymer OR (b) a PBF polymer. The residual plasticizer is preferably present in an amount of less than 10, more preferably 5, even more preferably 2, and most preferably 1 wt %. The content of plasticizer in the polymer may be measured by conventional methods such as that disclosed in Quantifying Polymer Plasticizer Content Through Direct Analysis of Tracer Compounds, IP.com Disclosure Number: IPCOM000246667D, Publication Date: 2016 Jun. 24. The residual unreacted cyclic polyester oligomer having furanic units is preferably present in an amount of less than 5, more preferably 2, even more preferably 1 wt %. In some embodiments, the content of residual plasticizer and unreacted cyclic oligomer is measured by their separation from the polymer via solvent extraction, high temperature distillation or column chromatography and then followed by their identification by UV, NMR, or IR spectroscopies and/or mass spectrometry. The PEF and PBF polymers will often preferably have molecular weights of at least 10,000, preferably 15,000, more preferably 20,000 Daltons relative to polystyrene standards as measured by SEC.

Figure 6:
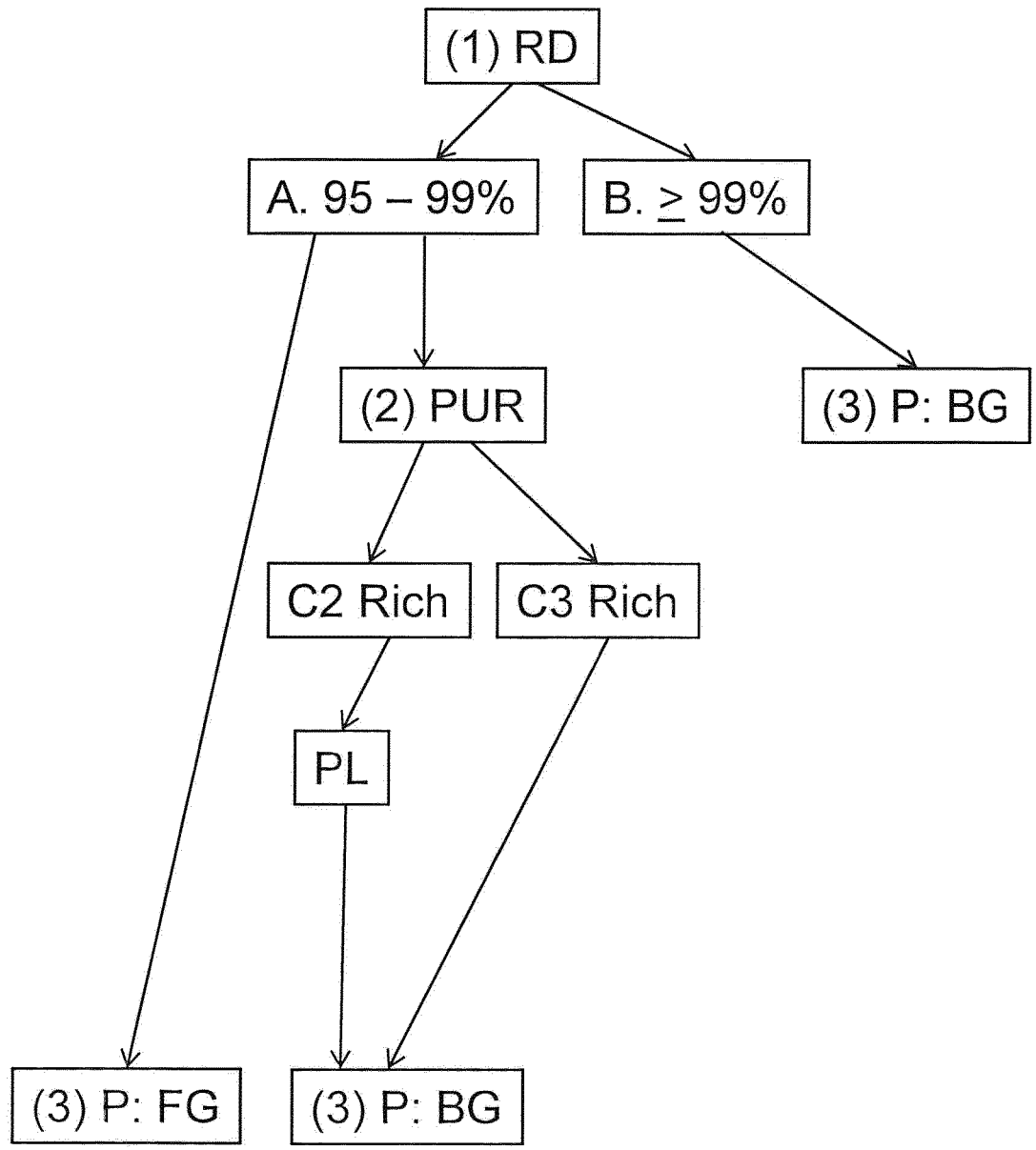
FIG. 6 shows a process flow diagram for the production of either a fiber grade (FG) or a bottle grade (BG) polyester polymer

FIG. 6 shows a process flow diagram for the production of either a fiber grade (FG) or a bottle grade (BG) polyester polymer having furanic units. In a first step (1) the cyclic polyester oligomer having furanic units is produced with a particular purity by a one-step reactive distillation (RD) in the presence of a solvent, in which the cyclic polyester oligomer having furanic units is produced and excess reactant, such as ethylene glycol, the condensation byproduct, and perhaps some solvent is removed.

In one embodiment (A) the cyclic polyester oligomerization under reactive distillation is carried out to give a cyclic polyester oligomer product having a purity of from about 95 to less than about 99% as measured by HPLC analysis. In another embodiment (B) the cyclic polyester oligomerization under reactive distillation is carried out to give a cyclic polyester oligomer product having a purity of at least about 99% as measured by HPLC analysis. The difference in purity as measured by HPLC in these two embodiments will be primarily due to linear oligomers. It is important to remove linear oligomers in order to prepare high molecular weight polyester polymers, for example, those suitable for bottle grade applications as the hydroxyl, ether, or carboxylic acid or ester end groups of the linear oligomers results in a production of more chains and thus a lower molecular weight polyester polymer produced by ring-opening polymerization. However, removal of linear oligomers may often also incidentally remove the catalyst for the cyclization reaction. Removal of linear oligomers may be carried out, for example, by adsorption on a zeolite or selective precipitation of cyclic polyester oligomers by cooling and/or addition of an antisolvent. This catalyst may subsequently be used advantageously in the polymerization. Incidentally-removed catalyst however may be replaced by the addition of fresh catalyst in the subsequent polymerization process.

In the case of embodiment (B) yielding a cyclic polyester oligomer product having a purity of at least about 99% as measured by HPLC analysis, the inventors have surprisingly found that this product may be readily directly polymerized to produce a "BG polyester polymer" having a weight average molecular weight, Mw, of at least about 50,000, preferably 55,000, more preferably 60,000 Dalton as measured by Size Exclusion Chromatography (SEC) analysis. This embodiment is quite advantageous as it has been found that it is not generally necessary to add catalyst. Furthermore, it has surprisingly been found that it is also not necessary to add plasticizer (PL) in order to carry out the polymerization. Without wishing to be bound to any particular mechanism, the inventors believe that plasticizer addition is not necessary as the formed polymeric species are themselves effective in plasticizing the high-melting C2 cyclic dimer polyester oligomer species.

Cyclic polyester oligomer products having a purity of from about 95 to less than about 99% as measured by HPLC analysis may be directly polymerized by ring-opening polymerization to yield a fibre grade (FG) polyester polymer. A "FG polyester polymer" has a weight average molecular weight, Mw, of from about 15,000 to 50,000, preferably 20,000 to 40,000, more preferably 25,000 to 35,000 Dalton as measured by Size Exclusion Chromatography (SEC) analysis.

Alternatively, cyclic polyester oligomer products having a purity of from about 95 to less than about 99% as measured by HPLC analysis may be next purified (PUR) to yield a purified dimer (C2)- or trimer (C3)-rich cyclic polyester product. Suitable purification methods (PUR) may include selective precipitation, fractionation chromatography such as over silica gel, extraction, or crystallization. Selective precipitation may often be preferred as the C2 and C3 species readily precipitate apart from each other. Crystallization may often be preferred for larger-scale or commercial processes as the melting points are quite different for the C2 and C3 species. One skilled in the art will understand that the C2- and C3-rich purified products may contain lesser amounts of other cyclic species; however, the purified C3-rich products will generally preferably have little or no high-melting C2 species.

Due to the high melting properties of the C2-rich purified cyclic polyester oligomer products due to the high-melting C2 component, it is generally necessary to add a plasticizer (PL) to them in order to polymerize them to produce bottle grade (BG) polyester polymer. Generally, it is also necessary to add catalyst again, and the addition of the plasticizer (PL) helps to efficiently distribute this added catalyst.

Since most or preferably essentially all of the high-melting C2 species has been removed from the purified C3-rich cyclic polyester oligomer, it is generally not necessary to add plasticizer (PL) for carrying out the polymerization to produce bottle grade (BG) polyester polymer. Generally, it is also necessary to add catalyst again, but the addition of the plasticizer (PL) is not required in order to efficiently distribute this added catalyst.

EXAMPLES

The following examples are set forth to provide those of ordinary skill in the art with a detailed description of how the processes, polyester polymer compositions, and uses claimed herein are evaluated, and they are not intended to limit the scope of what the inventors regard as their invention.

In these examples, the following characterization methods are parameters were used for the characterization of the cyclic polyester oligomer compositions prepared in the examples.

SEC-MALS

Conversion and Molecular weight distributions of the polyesters were analyzed using size exclusion chromatography coupled with multi-angle light scattering (SEC-MALS) on an Agilent 1100 GPC using two PFG linear M columns (PSS) connected in series with an Agilent 1100 VWD/UV detector operated at 290 nm, a DAWN HELEOS II multi-angle laser light scattering (MALS) detector (Wyatt Technology Europe) followed by an Agilent 1100 RI detector. Samples were eluted in HFIP with 0.02 M K-TFAc at 1 mL/min at room temperature.

$^1$H NMR

Measurements were made on a Bruker AV 300 spectrometer operating at a frequency of 300 MHz and using $CDCl_3$ as solvent.

HPLC-MS

An Agilent 1200 Series HPLC with a quaternary pump, autosampler and UV detector was equipped with an Agilent Eclipse XDB-C18, 5 m, 4.6×150 mm column. The eluent mixture was composed of (A) Water stabilized with formic acid (1 mL/L) and (B) Acetonitrile stabilized with formic acid (1 mL/L). A gradient was run at 1 mL/min for 60 min. Solvent ratio of B was changed linearly from 20% to 45.2% during 11 min, then from 45.2% to 80% during 29 min, followed by 10 minutes at 97% and 10 minutes at 20%. Samples were dissolved at 1 mg/mL in HFIP/CHCL3 (15%). Injection volume was 10 □L and UV detection was carried out at 280 nm. Peaks were characterized by online-mass spectroscopy with an Agilent 1640 single-quadrupol MS.

MALDI-TOF

The matrix was T-2-[3-(4-t-Butyl-phenyl)-2-methyl-2-propenylidene]malononitrile (DCTB)+Na Mix 10:1, and the instrument type was a Bruker Daltonics Ultraflex II, and the acquisition mode was reflector.

Example 1: A Cyclic Polyester Oligomer Composition (Embodiment of $Y^{1'}$) for Production of PEF In this example, the preparation is described of the cyclic polyester oligomer shown in FIG. 3, which may then subsequently be used to prepare PEF, poly(2,5-ethylene furandicarboxylate). 40 g of me-FDCA were charged together with 20 mL of EG into a glass reactor equipped with a stirrer. The reaction was carried out under inert atmosphere at a starting temperature of 140° C. in the presence of 0.50 g catalyst (Bu2SnO) and progressively heated to a final temperature 180° C. After 1 hour of reaction pressure was reduced to 700 mbar; pressure was reduced again after 40 minutes to 400 mbar and further to 200 mbar after 30 minutes. Finally, the pressure was stepwise reduced until 10 mbar. Temperature was increased up to 200° C. and the system was left under this condition for 2 hours. The system was allowed to cool to room temperature and the solid product was removed, ground, and dried. The pre-polymer obtained was characterized with HPLC and GPC, and its identity was confirmed to be $C^{1'}$.

The pre-polymer $C^{1'}$ was dissolved in 2-methylnaphthalene as solvent at a concentration of 10 g/l, and the resulting solution was reacted under inert atmosphere at 200° C. (in the absence of added additional catalyst) for 3 hours in order to transform the pre-polymer $C^{1'}$ into the cyclic oligomer $Y^{1'}$. Next Zeolite Y was added at a concentration of 10 g/l. HPLC analysis confirmed that the concentrations of the cyclic oligomers (m=2 to 5) remained essentially unchanged, but that the linear species (l=1 to 8) were essentially removed from the solution. This result confirms that unreacted linear residual species can be easily removed from the reaction system by adsorption on zeolites.

Comparative Example 1 and 2: Lack of Polymerization of Cyclic Polyester Oligomer Composition ($Y^{1'}$) In the Presence of Low Amount of Plasticizer Without Catalyst or Without Catalyst or Plasticizer In this example, the cyclic oligomer Y1' (m=2) of Example 1 was reacted for 30 min each at different temperatures between 260° C. and 320° C. with tetra-glyme as plasticizer at a concentration of 60 uL tetra-glyme per 180 mg of cyclic oligomer Y1' and in the absence of added catalyst under inert atmosphere. No reaction occurred and the material remained unchanged.

In a second comparative example, a mixed cyclic oligomer Y1' (m=2 to 7) of Example 1 was reacted at a temperature of 280° C. for 60 min without added plasticizer or catalyst. GPC analysis confirmed that no reaction of the m=2 cyclic oligomer occurred. Therefore, these comparative examples show that the typically most-abundant species, the low Mw cyclic oligomers (m=2), will not polymerize in the absence of catalyst or plasticizer.

Example 2: Production of PEF from Cyclic Polyester Oligomer Composition ($Y^{1'}$): in the Presence of Low Amount of Plasticizer with Catalyst In this example, the cyclic oligomer Y1' (m=2) of Example 1 was reacted as in the Comparative Example 1, but in the presence of cyclic stannoxane as catalyst in a concentration of 0.1 mol % per mol cyclic oligomer repeat units. In this case, a conversion of greater than 95% was achieved within 20 min.

Figure 5:
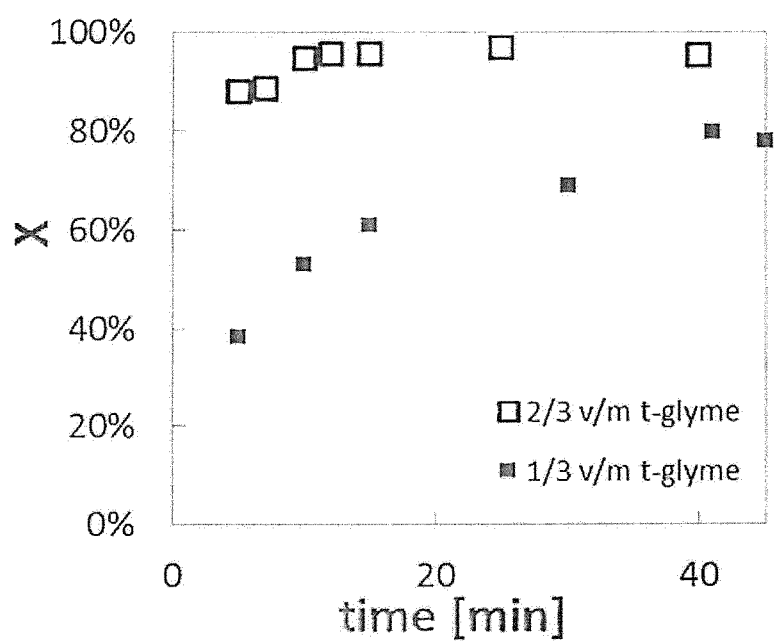
FIG. 5 shows the effect of plasticization on the conversion of the cyclic PEF dimer during ring-opening polymerization.

FIG. 5 shows comparative data for the conversion of the cyclic PEF dimer with both a lower (⅓ v/m) and a higher (⅔ v/m) concentration of the tetra-glyme plasticizer.

In other runs of the polymerization, other metal oxide catalysts such as $Sb_2O_3$ or $Bi_2O_3$ were compared to tin-based catalysts. It was observed that the polymers prepared using the $Sb_2O_3$ or $Bi_2O_3$ were more water-white in appearance than the somewhat yellowish-brown colour obtained with the tin-based catalysts.

Example 3: Production of PEF from Cyclic Polyester Oligomer Composition ($Y^{1'}$): In the Presence of Higher Amount of Plasticizer without Catalyst In this example, the cyclic oligomer Y1' (m=2) of Example 1 was reacted as in the Comparative Example 1, with tetra-glyme as plasticizer at a higher concentration of 240 μL tetra-glyme per 180 mg of cyclic oligomer Y1'. In this case, a conversion of greater than 95% was achieved within 60 min at all temperatures.

Example 4: Production of PEF from Cyclic Polyester Oligomer Composition: In the Presence of Catalyst In this example, the cyclic oligomer was prepared by reactive distillation of this species:

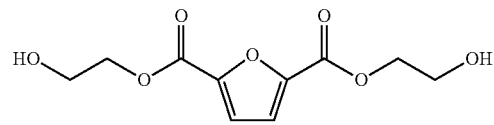 [SMILES: O=C(OCCO)c1ccc(C(=O)OCCO)o1]

in dichlorobenzene (DCB) with a purity of about 95% as determined by HPLC. It was then purified over silica gel using DCB to greater than 99% purity as determined by HPLC. Ring-opening polymerization was then conducted using 0.1% cySTOX as catalyst to yield a bottle-grade PEF polymer having a molecular weight of 60,000 Dalton as determined by SEC analysis.

Example 5: Production of PEF from Cyclic Polyester Oligomer Composition

In this example, the cyclic oligomer was prepared by prepolymerization of dimethyl FDCA and ethylene glycol (EG) over two hours to yield EG-FDCA-EG with an Mn of less than 1,000 Dalton. Subsequent reactive distillation over 2 hours in dichlorobenzene (DCB) yielded the cyclic oligomer with a purity of about 95% as determined by HPLC. It was then purified over silica gel using DCB to greater than 99% purity as determined by HPLC. Ring-opening polymerization was then conducted to yield a bottle-grade PEF polymer having a molecular weight of 60,000 Dalton as determined by SEC analysis.

Example 6: Production of PEF from Cyclic Polyester Oligomer Composition

In this example, the cyclic oligomer was prepared by reactive distillation of this species:

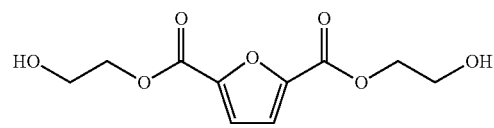 [SMILES: O=C(OCCO)c1ccc(C(=O)OCCO)o1]

in dichlorobenzene (DCB), which yielded the cyclic oligomer with a purity of about 95% as determined by HPLC. It was then directly polymerized by ring-opening polymerization to yield a fiber-grade PEF polymer having a molecular weight of 35,000 Dalton as determined by SEC analysis.

Example 7

In an example of the invented DA-C process, 1 g of the dimethyl ester, meFDCA, was charged together with 1.3 g of ethylene glycol (EG) under inert atmosphere in a 100 mL flask equipped with a distillation bridge and a collection flask. The mixture was heated to 140° C. at which 16 mg of cyclic stannoxane were added to the melt and the temperature was increased to 200° C. The mixture was kept at 200° C. for 1 h during which 0.2 mL of MeOH and EG were collected in the collection flask. Subsequently 125 mL of o-dichlorobenzene (o-DCB) were added to the melt. Over a course of 7 h, 25 mL of EG and o-DCB were collected by evaporation. The resulting mixture contained 10 g/L cyclic polyester oligomers at a cyclic purity of 96%, where the remaining impurities were linear oligomers.

Example 8

In another example of the invented DA-C process, 2 g of meFDCA was charged together with 2.6 g of EG under inert atmosphere in a 100 mL flask equipped with a distillation bridge and a collection flask. The mixture was heated to 140° C. at which 32 mg of cyclic stannoxane were added to the melt and the temperature was increased to 200° C. The mixture was kept at 200° C. for 1 h during which 0.2 mL of MeOH and EG were collected in the collection flask. Subsequently 125 mL of o-DCB were added to the melt. Over a course of 7 h, 25 mL of EG and o-DCB were collected by evaporation. The resulting mixture contained 20 g/L cyclic polyester oligomers at a cyclic purity of 93%, where the remaining impurities were linear oligomers.

Example 9

In yet another example of the invented DA-C process, 3 g of meFDCA was charged together with 3.9 g of EG under inert atmosphere in a 100 mL flask equipped with a distillation bridge and a collection flask. The mixture was heated to 140° C. at which 48 mg of cyclic stannoxane were added to the melt and the temperature was increased to 200° C. The mixture was kept at 200° C. for 1 h during which 0.2 mL of MeOH and EG were collected in the collection flask. Subsequently 125 mL of o-DCB were added to the melt. Over a course of 7 h, 25 mL of EG and o-DCB were collected by evaporation. The resulting mixture contained 30 g/L cyclic polyester oligomers at a cyclic purity of 91%, where the remaining impurities were linear oligomers.

Example 10

In still yet another example of the invented DA-C process, 1 g of meFDCA was charged together with 1.3 g of EG under inert atmosphere in a 100 mL flask equipped with a distillation bridge and a collection flask. The mixture was heated to 140° C. at which 16 mg of cyclic stannoxane were added to the melt and the temperature was increased to 200° C. The mixture was kept at 200° C. for 40 min during which 0.15 mL of MeOH and EG were collected in the collection flask. Subsequently 10 mL of o-DCB were added to the melt. Over a course of 20 min, 10 mL of EG and o-DCB were collected by evaporation. Finally, 125 mL of o-DCB were added to the melt. Over a course of 3 h 25 mL of EG and o-DCB were removed. The resulting mixture contained 10 g/L cyclic polyester oligomers at a cyclic purity of 97%, where the remaining impurities were linear oligomers.

Example 11

In yet a further example of the invented DA-C process, 1 g of meFDCA was charged together with 1.3 g of EG under inert atmosphere in a 100 mL flask equipped with a distillation bridge with a collection flask and a dripping funnel. The mixture was heated to 140° C. at which 16 mg of cyclic stannoxane were added to the melt and the temperature was increased to 200° C. The mixture was kept at 200° C. for 1 h during which 0.2 mL of MeOH and EG were collected in the collection flask. Subsequently 100 mL of o-DCB were added to the melt. Over a course of 7 h, 60 mL of EG and o-DCB were removed by distillation and in parallel the same amount was fed back to the system. The resulting mixture contained 10 g/L cyclic polyester oligomers at a cyclic purity of 98.5%, where the remaining impurities were linear oligomers.

Example 12

Figure 7:
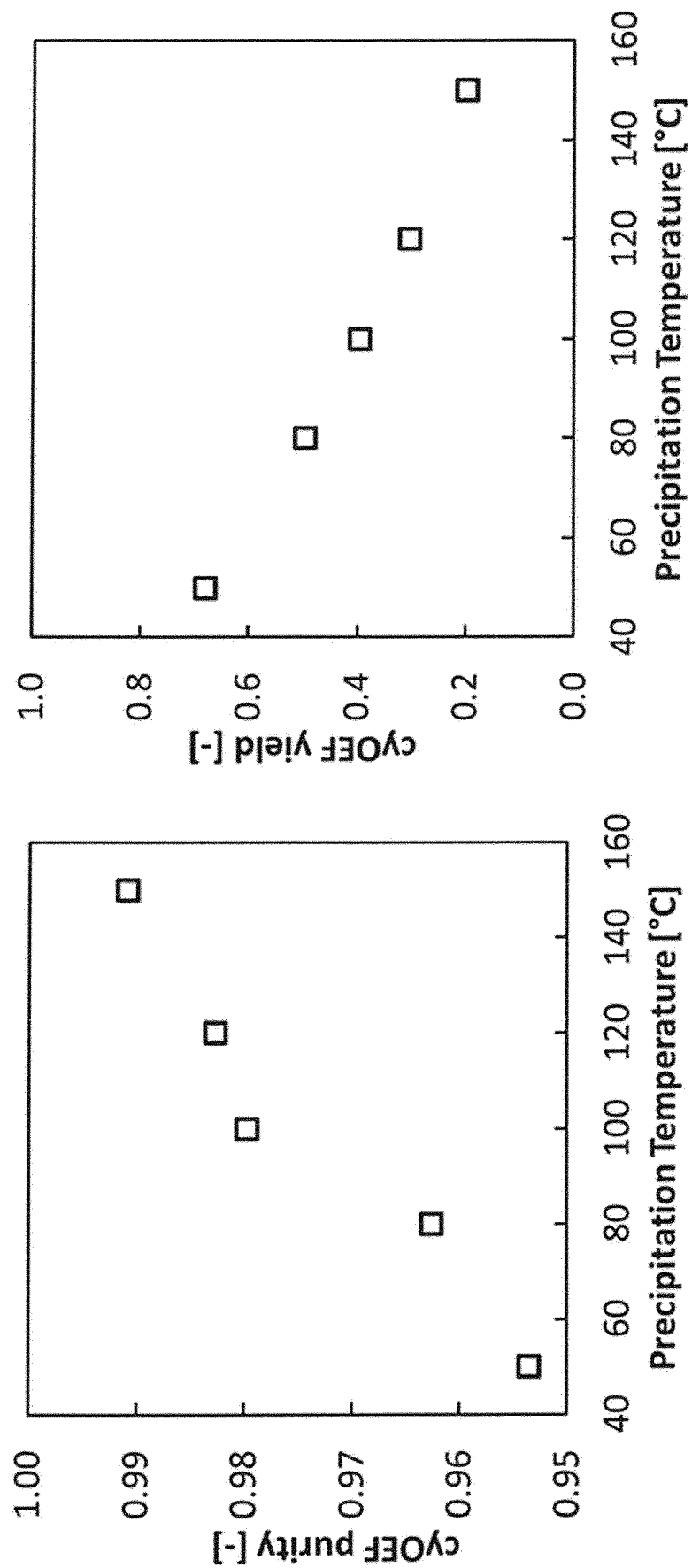
FIG. 7 shows the yield and purity of some purified cyclic polyester oligomer compositions prepared by selective precipitation.

In still yet a further example of the invented DA-C process, the reaction solution from example 1 was cooled down stepwise from 180° C. to 50° C. At 150° C., 120° C., 100° C., 80° C. and 50° C., the product was left at constant temperature for 1 h after which a sample was taken, filtered and the composition of the solid and the liquid phase was determined. From this data yield and purity of the precipitated cyclics were determined, as shown in FIG. 7. The data in this figure shows that the purity increases—but the yield decreases—as the precipitation temperature is increased.

Example 13

Figure 8:
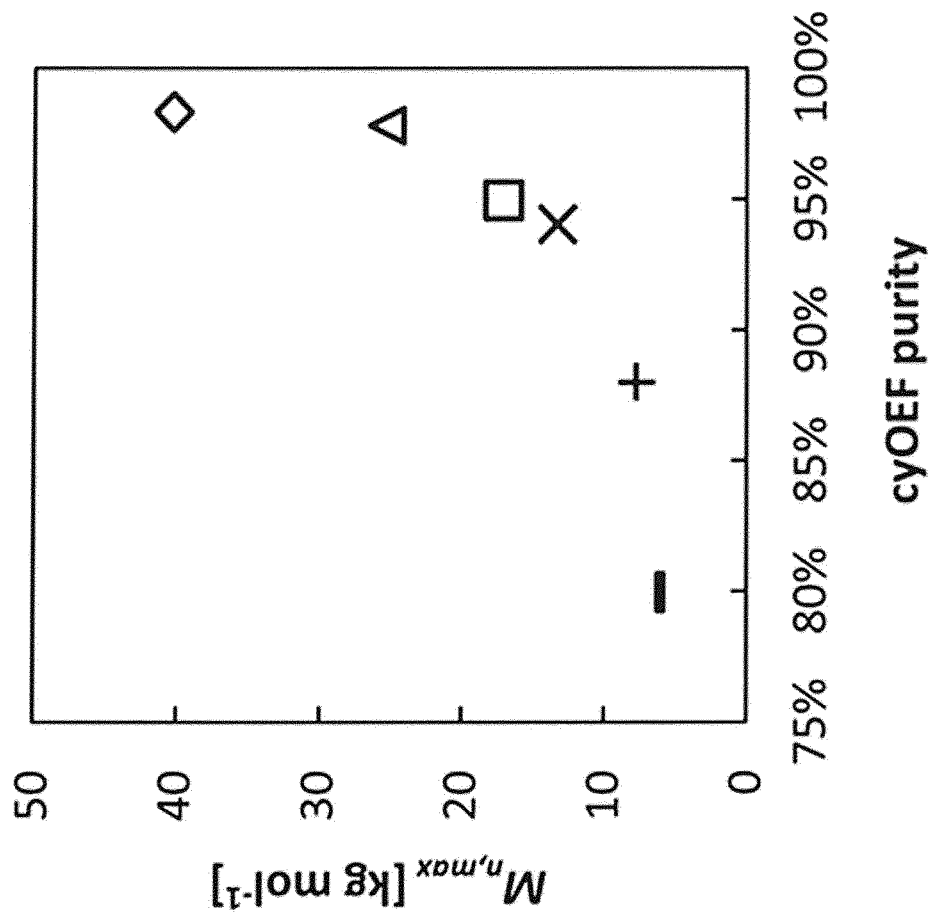
FIG. 8 shows the conversion and molecular weight properties of polyester polymers prepared from cyclic polyester oligomer compositions of different purity.
Figure 9:
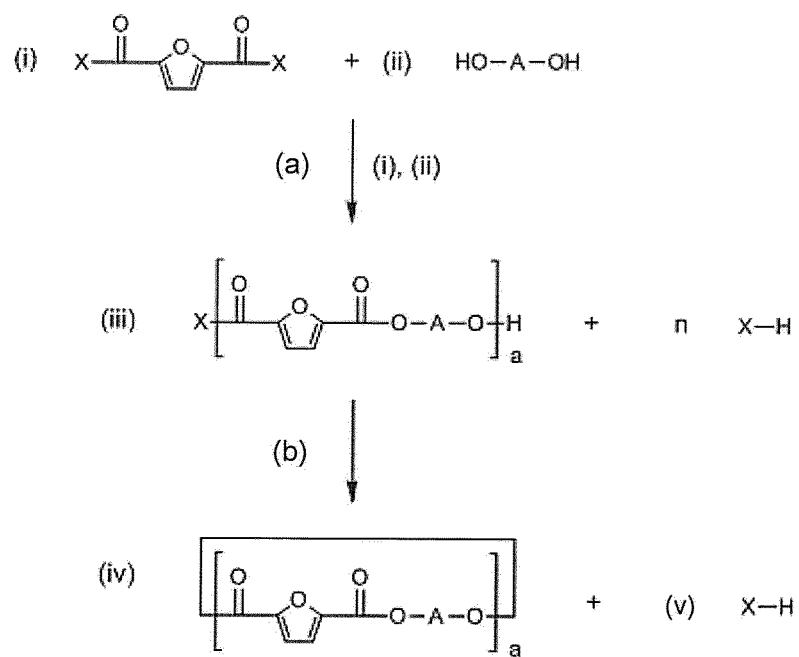
FIG. 9 shows a schematic reaction scheme for an embodiment of the process according to the present invention for producing a (iv) cyclic polyester oligomer composition.

In even yet a further example of the invented DA-C process, cyclic polyester oligomers with varying purities, obtained from similar reactions as described in the examples above were charged in flasks under inert atmosphere and heated rapidly to 260° C. Depending on the purity of the cyclic polyester oligomers, different Mw products were obtained as illustrated in FIG. 8. In particular, it is seen that a high purity of cyclic polyester oligomer allows the production of high molecular weight polyester polymers.

While various embodiments have been set forth for the purpose of illustration, the foregoing descriptions should not be deemed to be a limitation on the scope herein. Accordingly, various modifications, adaptations, and alternatives can occur to one skilled in the art without departing from the spirit and scope herein.

EMBODIMENTS i. A process to prepare a cyclic polyester oligomer composition comprising a cyclic polyester oligomer having furanic units, wherein the process comprises:
a step of either:
(I) reacting a monomer component $C^1$ or $D^1$ in the presence of an optional catalyst and/or optional organic base in a ring closing oligomerization step under conditions of a reaction temperature and reaction time sufficient to yield a cyclic polyester oligomer having furanic units and of structure $Y^1$, wherein the monomer component $C^1$ comprises the structure

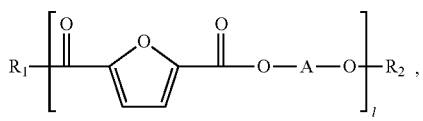

and wherein each of the groups A is an optionally-substituted linear, branched or cyclic alkyl, phenyl, aryl, or alkylaryl, and wherein l is an integer from 1 to 100, preferably 2 to 50, most preferably 3 to 25,
and wherein
$R_1$=OH, OR, halogen, or O-A-OH,
R=optionally substituted linear, branched or cyclic alkyl, phenyl, aryl or alkylaryl,

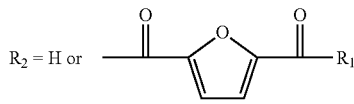

wherein the monomer component $D^1$ comprises the structure

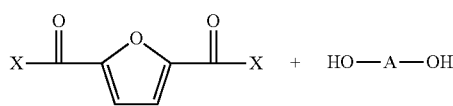

and wherein A is an optionally-substituted linear, branched or cyclic alkyl, phenyl, aryl, or alkylaryl, and wherein each of the groups X is an OH, a halogen, or an optionally-substituted alkyloxy, phenoxy, or aryloxy, and wherein the groups X are not OH when A is n-butyl, and wherein the structure $Y^1$ of the cyclic polyester oligomer having furanic units is

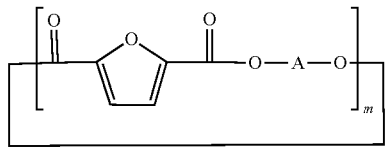

wherein m is an integer from 1 to 20, preferably 2 to 15, most preferably 3 to 10,
OR
(II) reacting a monomer component $C^2$ or $D^2$ in the presence of an optional catalyst and/or optional organic base in a ring closing oligomerization step under conditions of a reaction temperature and reaction time sufficient to yield a cyclic polyester oligomer having furanic units and of structure $Y^2$, wherein the monomer component $C^2$ comprises the structure

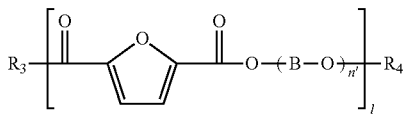

and wherein each of the groups B is an optionally-substituted linear, branched or cyclic alkyl, phenyl, aryl, or alkylaryl, wherein l is an integer as defined above, and wherein n' is an integer from 1 to 20, preferably 2 to 10, and wherein
$R_3$=OH, OR, halogen, or O—(B—O)$_{n'}$—H,
R=optionally substituted linear, branched or cyclic alkyl, phenyl, aryl or alkylaryl,

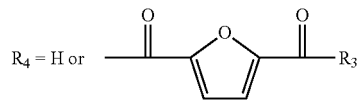

the monomer component $D^2$ comprises the structures

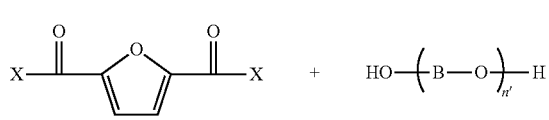

and wherein each of the groups X is an OH, a halogen, or an optionally-substituted alkyloxy, phenoxy, or aryloxy, each of the groups B is an optionally-substituted linear, branched or cyclic alkyl, phenyl, aryl, or alkylaryl, and n' is an integer as defined above, and wherein the structure $Y^2$ of the cyclic polyester oligomer having furanic units is

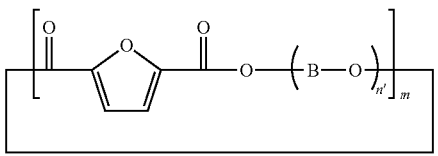

wherein each of the groups B is an optionally-substituted linear, branched or cyclic alkyl, phenyl, aryl, or alkylaryl, n' is an integer as defined above, and m is an integer from 1 to 20, preferably 2 to 15, most preferably 3 to 10,
AND
an optional subsequent step (III) in which linear oligomeric polyester species having furanic units are separated and removed from the cyclic oligomeric composition comprises one or more of the following sub-steps: (a) passing a mobile phase of the cyclic oligomeric composition through a stationary phase, preferably silica gel, (b) selective precipitation, (c) distillation, (d) extraction, (e) crystallization, (f) adding a zeolite and absorbing impurities onto the zeolite, (g) cooling the cyclic oligomeric composition in order to precipitate out cyclic polyester oligomers having furanic units, (h) adding an antisolvent in order to precipitate out cyclic polyester oligomers having furanic units, (i) separating zeolites having absorbed impurities from the cyclic oligomeric composition,
characterized in that
the reacting of the monomer component C1 or D1 or $C^2$ or $D^2$ in the presence of an optional catalyst and/or optional organic base in a ring closing oligomerization step is carried out by reactive distillation in the presence of a solvent, wherein the solvent is selected from the group consisting of an ionic liquid, an optionally-substituted napthalene, optionally-substituted aromatic compound, and their mixtures, and wherein an excess of a monomer component C1 or D1 or C2 or D2, preferably ethylene glycol, and a condensation byproduct, preferably water, alcohol, or a halogen acid, and optionally some solvent are removed in the reactive distillation, and wherein a cyclic polyester oligomer composition is formed with a purity as measured by HPLC of EITHER (a) from about 95 to about 99% OR (b) about 99% or more during the reactive distillation.

ii. The process of embodiment i, wherein the cyclic polyester oligomer composition is formed with a purity as measured by HPLC of from about 95 to about 99%, and a ring-opening polymerization is subsequently carried out on the cyclic polyester oligomer composition, preferably in the absence of an optional added catalyst and preferably in the absence of an optional plasticizer, to yield a polyester polymer having furanic units and a weight average molecular weight, Mw, of from about 15,000 to 50,000, preferably 20,000 to 40,000, more preferably 25,000 to 35,000 Dalton as measured by Size Exclusion Chromatography (SEC) analysis.

iii. The process of embodiment i, wherein the cyclic polyester oligomer composition is formed with a purity as measured by HPLC of from about 95 to about 99%, and wherein the cyclic polyester oligomer composition is next further purified, preferably by selective precipitation, fractionation chromatography preferably over silica gel, extraction or crystallization, to yield a cyclic polyester oligomer composition having a substantially increased content of cyclic dimer polyester oligomer, preferably the cyclic dimer polyester oligomer having a double endotherm and preferably a melting point at about 370° C. as measured by DSC, and a ring-opening polymerization is carried out on the further purified cyclic polyester oligomer composition, optionally in the presence of an optional added catalyst, and in the presence of an added plasticizer to yield a polyester polymer having furanic units and a weight average molecular weight, Mw, of at least about 50,000, preferably 55,000, and more preferably 60,000 Dalton as measured by Size Exclusion Chromatography (SEC) analysis.

iv. The process of embodiment i, wherein the cyclic polyester oligomer composition is formed with a purity as measured by HPLC of from about 95 to about 99%, and wherein the cyclic polyester oligomer composition is next further purified, preferably by selective precipitation, fractionation chromatography preferably over silica gel, extraction or crystallization, to yield a cyclic polyester oligomer composition having:
(i) a substantially reduced, preferably substantially eliminated content of cyclic dimer polyester oligomer, wherein the cyclic dimer polyester oligomer preferably has a double endotherm and preferably a melting point at about 370° C. as measured by DSC,
(ii) a substantially increased content of cyclic trimer polyester oligomer, wherein the cyclic polyester trimer preferably has a melting point of about 272° C. as measured by DSC, and a ring-opening polymerization is carried out on the further purified cyclic polyester oligomer composition, optionally in the presence of an optional added catalyst and preferably in the absence of an optional added plasticizer, to yield a polyester polymer having furanic units and a weight average molecular weight, Mw, of at least about 50,000, preferably 55,000, and more preferably 60,000 Dalton as measured by Size Exclusion Chromatography (SEC) analysis.

v. The process of embodiment i, wherein the cyclic polyester oligomer composition is formed with a purity as measured by HPLC of from at least about 99%, and a ring-opening polymerization is carried out on the cyclic polyester oligomer composition, optionally in the presence of an optional added catalyst and preferably in the absence of an optional added plasticizer, to yield a polyester polymer having furanic units and a weight average molecular weight, Mw, of at least about 50,000, preferably 55,000, and more preferably 60,000 Dalton as measured by Size Exclusion Chromatography (SEC) analysis.

vi. The process of any one of embodiments i to v, wherein the optional subsequent step (III) in which linear oligomeric polyester species having furanic units are separated and removed from the cyclic oligomeric composition is carried out.

vii. The process of any one of embodiments i to vi, wherein either:
(I)—the monomer component is $C^1$ and A is an optionally-substituted linear, branched or cyclic alkyl, l is an integer from 3 to 25, and m is an integer from 3 to 10,
OR
the monomer component is $D^1$ and A is an optionally-substituted linear, branched or cyclic alkyl, X is a halogen, or optionally-substituted alkyloxy or phenoxy, and m is as defined previously in this claim, and wherein the structure of the cyclic polyester oligomer having furanic units is one of $Y^1$,
OR
(II)—the monomer component is $C^2$ and wherein B is an optionally-substituted linear, branched or cyclic alkyl, l and m are integers as defined above, and n' is an integer from 2 to 10,
OR
  the monomer component is $D^2$, and wherein X is an OH, a halogen, or optionally-substituted alkyloxy, phenoxy, or aryloxy, B is an optionally-substituted linear, branched or cyclic alkyl, or phenyl, and n' and m are integers as defined previously in this claim, and wherein the structure of the cyclic polyester oligomer having furanic units is one of $Y^2$.

viii. The process of any one of embodiments I to vii, wherein either
  the monomer component is $C^1$ and A is an optionally-substituted linear, branched or cyclic $C_1$ to $C_6$ alkyl, and l is an integer from 3 to 25, and m is an integer from 3 to 10,
  the monomer component is $D^1$ and A is an optionally-substituted linear, branched or cyclic $C_1$ to $C_6$ alkyl, X is a halogen, or optionally-substituted alkyloxy or phenoxy, and m is an integer as defined above,
  the monomer component is $C^2$ and wherein B is an optionally-substituted linear, branched or cyclic $C_1$ to $C_6$ alkyl, l and m are integers as defined above and n' is an integer from 2 to 10,
OR
  the monomer component is $D^2$, X is a halogen, or an optionally-substituted alkyloxy, phenoxy, or aryloxy, B is an optionally-substituted linear, branched or cyclic $C_1$ to $C_6$ alkyl, or phenyl, and n' and m are integers as defined in claim 2.

ix. The process of any one of embodiments i to viii, wherein the monomer component is $C^1$ or $C^2$ and the reaction temperature is from 100 to 350, preferably 150 to 300, most preferably 180 to 280° C., and wherein the reaction time is from 30 to 600, preferably 40 to 400, most preferably 50 to 300 minutes,

OR wherein the monomer component is $D^1$ or $D^2$ and the reaction temperature is from −10 to 150, preferably −5 to 100, most preferably 0 to 80° C., and wherein the reaction time is from 5 to 240, preferably 10 to 180, most preferably 15 to 120 minutes.

x. The process of any one of claims i to ix, wherein either the monomer component $C^1$ comprises the specific structure

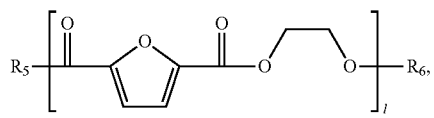

or the monomer component $D^1$ comprises the specific structure

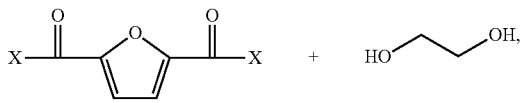

and the structure $Y^1$ of the cyclic polyester oligomer having furanic units is the specific structure

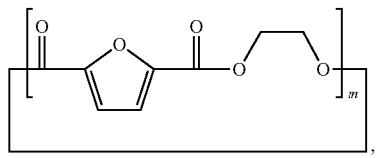

wherein $R_5$=OH, OR, halogen, or O—CH$_2$CH$_2$—OH,

R=optionally substituted linear, branched or cyclic alkyl, phenyl, aryl or alkylaryl,

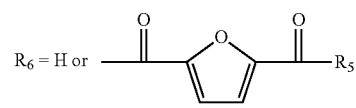

and X, l, and m are defined as indicated in the previous claim(s) on which this claim depends.

xi. The process of any one of embodiments i to ix, wherein either the monomer component $C^1$ comprises the specific structure $C^{1''}$

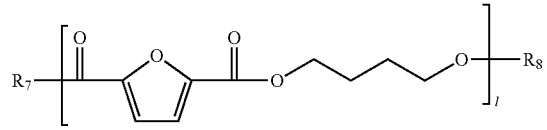

or the monomer component $D^1$ comprises the specific structure $D^{1'''}$

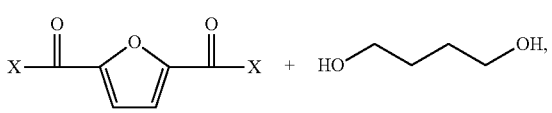

and the structure $Y^1$ of the cyclic polyester oligomer having furanic units is the specific structure $Y^{1''}$

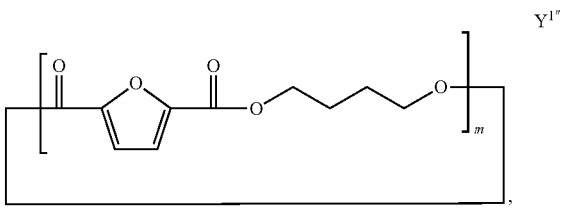

$R_7$=OH, OR, halogen, or O—CH$_2$CH$_2$ CH$_2$CH$_2$—OH,

R=optionally substituted linear, branched or cyclic alkyl, phenyl, aryl or alkylaryl,

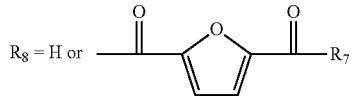

and X, l, and m are defined as indicated in the previous claim(s) on which this claim depends.

xii. The process of any one of embodiments i to xi, wherein the optional organic base E is present and it is a monoamine compound or a compound having the structure

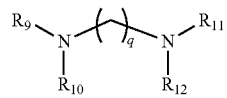

wherein each of the groups $R_9$ to $R_{12}$ are hydrogen, optionally-substituted alkyl, phenyl, aryl, or alkaryl, and wherein each of the groups $R_9$ to $R_{12}$ may optionally be bonded together by a single or double bond group as part of a cyclic substituent in a cyclic optional organic base E, preferably wherein the organic base E is either:

(i) DABCO, having the structure:

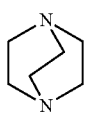

OR
(ii) DBU, having the structure:

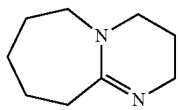 [SMILES: C1CCC2=NCCCN2CC1]

and wherein DABCO or DBU are optionally used together with an alkyl amine, more preferably trimethylamine, and wherein the optional organic base E is preferably present in a stoichiometric ratio of from 0.5 to 6, preferably 1 to 4, more preferably 2 to 3 mol relative to 1 mol of all monomer component species used as a reactant in the process.

xiii. The process of any one of embodiments i to xii, wherein the optional catalyst is either absent or it is present and it is a metal alkoxide or metal carboxylate, preferably one of tin, zinc, magnesium, calcium, titanium, iron, or aluminium, or it is selected from a cyclic dibutyltin compound, $Sb_2O_3$, and $SnOct_2$, more preferably wherein the cyclic dibutyltin compound is 1,1,6,6-Tetra-n-butyl-1,6-distanna-2,5,7,10-tetraoxyacyclodecane.

xiv. The process of any one of embodiments ii to v, wherein the plasticizer is present and is one or more selected from the group consisting of a supercritical fluid and a polyether, preferably wherein the supercritical fluid is carbon dioxide or the polyether is a glyme, preferably tetraethylene glycol dimethyl ether.

xv. A polyester polymer composition obtainable, preferably obtained, by the process of any one of embodiments ii to xiv, wherein the composition contains: (i) optionally a plasticizer selected from the group consisting of an optionally-substituted phenyl ether, an ionic liquid, an optionally-substituted xylene, a polyether, and their mixtures,
(ii) a cyclic polyester oligomer having furanic units, preferably one characterized by the presence of an endotherm at about 370° C., more preferably a double endotherm at about 285° C. and about 370° C., and (iii) EITHER:
(a) a PEF polymer comprising the structure

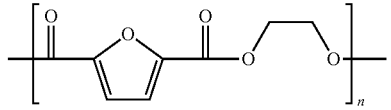

OR
(b) a PBF polymer comprising the structure

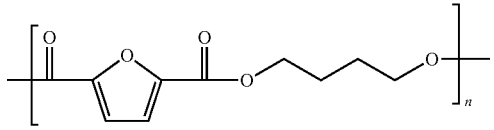

wherein n is an integer from 10 to 100,000, preferably 100 to 10,000.

The invention claimed is:
1. A process to produce a (iv) cyclic polyester oligomer composition comprising cyclic polyester oligomers having two to five repeat units and containing furanic units, the process comprising:
(a) reacting a monomer composition comprising: (i) a bifunctional furan-derivative having two functional groups selected from the group consisting of carboxylic acid, ester, acid halide and their combinations and (ii) a diol in a linear oligomerization step to produce a (iii) linear polyester oligomer composition comprising a linear oligomer species containing one or more furanic units and two to four repeat units; and
(b) reacting the (iii) linear polyester oligomer composition in a distillation-assisted cyclization (DA-C) step to form a (iv) cyclic polyester oligomer composition comprising cyclic oligomers having two to five repeat units and containing furan units and a (v) diol byproduct,
the (v) diol byproduct being removed by evaporation in the distillation-assisted cyclization (DA-C) step, and
the distillation-assisted cyclization (DA-C) step comprising a cyclization reaction in a reaction vessel that is accompanied by simultaneous removal of condensation reaction byproducts and a solvent through evaporation, followed by collection of the condensation reaction byproducts and the solvent via condensation in a separate vessel.

2. The process of claim 1, wherein the (b) distillation-assisted cyclization (DA-C) step takes place in the presence of the solvent.

3. The process of claim 1, wherein the viscosity during the (a) linear oligomerization step remains less than 50 centipoise.

4. The process of claim 1, wherein the pressure during the (a) linear oligomerization step remains at least about 0.8 atm.

5. The process of claim 1, wherein the (ii) diol or (v) diol byproduct are ethylene glycol or butylene glycol.

6. The process of claim 1, wherein the (i) bifunctional furan-derivative having two functional groups is 2,5-furandicarboxylic acid (FDCA) or a derivative of FDCA.

7. The process of claim 6, wherein the derivative of FDCA is a diester derivative.

8. The process of claim 1, wherein one or more catalysts are present during the (a) linear oligomerization step or the (b) distillation-assisted cyclization (DA-C) step.

9. The process of claim 1, wherein the (iv) cyclic polyester oligomer composition comprising cyclic polyester oligomers having two to five repeat units and containing furanic units is directly polymerized without intermediate purification to yield a polyester polymer having an Mn of at least about 5,000 Dalton.

10. The process of claim 1, wherein the (iv) cyclic polyester oligomer composition comprising cyclic polyester oligomers having two to five repeat units and containing furan units is subsequently purified by selective precipitation to form a (iv.a) purified cyclic polyester oligomer composition by separating one or more linear oligomers or monomeric species.

11. The process of claim 10, wherein the separated one or more linear oligomers or monomeric species are recycled to produce a (iv.b.) further cyclic polyester oligomer composition comprising cyclic polyester oligomers having two to five repeat units and containing furanic units.

12. The process of claim 10, wherein the (iv.a) purified cyclic polyester oligomer composition or the (iv.b) further cyclic polyester oligomer composition are polymerized to yield a polyester polymer having an Mn of at least about 5,000 Dalton.

13. The process of claim 2, wherein the viscosity during the (a) linear oligomerization step remains less than 50 centipoise.

14. The process of claim 3, wherein the pressure during the (a) linear oligomerization step remains at least about 0.8 atm.

15. The process of claim 4, wherein the (ii) diol or (v) diol byproduct are ethylene glycol or butylene glycol.

16. The process of claim 5, wherein the (i) bifunctional furan-derivative having two functional groups is 2,5-furandicarboxylic acid (FDCA) or a derivative of FDCA.

17. The process of claim 7, wherein one or more catalysts are present during the (a) linear oligomerization step or the (b) distillation-assisted cyclization (DA-C) step.

18. The process of claim 8, wherein the (iv) cyclic polyester oligomer composition comprising cyclic polyester oligomers having two to five repeat units and containing furanic units is directly polymerized without intermediate purification to yield a polyester polymer having an Mn of at least about 5,000 Dalton.

19. The process of claim 8, wherein the (iv) cyclic polyester oligomer composition comprising cyclic polyester oligomers having two to five repeat units and containing furan units is subsequently purified by selective precipitation to form a (iv.a) purified cyclic polyester oligomer composition by means of separating one or more linear oligomers or monomeric species.

20. The process of claim 11, wherein the (iv.a) purified cyclic polyester oligomer composition or the (iv.b) further cyclic polyester oligomer composition are polymerized to yield a polyester polymer having an Mn of at least about 5,000 Dalton.

\* \* \* \* \*